(12) United States Patent
Hashimoto et al.

(10) Patent No.: US 9,933,635 B2
(45) Date of Patent: Apr. 3, 2018

(54) OPTICAL MATERIAL, COMPOSITION FOR OPTICAL MATERIAL, AND USE THEREOF

(71) Applicant: MITSUI CHEMICALS, INC., Minato-ku, Tokyo (JP)

(72) Inventors: Toshiya Hashimoto, Ichihara (JP); Naoyuki Kakinuma, Omuta (JP); Kouya Kojima, Urayasu (JP)

(73) Assignee: MITSUI CHEMICALS INC., Minato-Ku, Tokyo (JP)

( * ) Notice: Subject to any disclaimer, the term of this patent is extended or adjusted under 35 U.S.C. 154(b) by 0 days.

(21) Appl. No.: 14/765,980

(22) PCT Filed: Feb. 27, 2014

(86) PCT No.: PCT/JP2014/054971
§ 371 (c)(1),
(2) Date: Aug. 5, 2015

(87) PCT Pub. No.: WO2014/133111
PCT Pub. Date: Sep. 4, 2014

(65) Prior Publication Data
US 2015/0370094 A1    Dec. 24, 2015

(30) Foreign Application Priority Data

Feb. 27, 2013    (JP) .................................. 2013-036694
Dec. 13, 2013    (JP) .................................. 2013-258501

(51) Int. Cl.
*G02C 3/00*      (2006.01)
*G02C 7/10*      (2006.01)
(Continued)

(52) U.S. Cl.
CPC ............. *G02C 7/108* (2013.01); *G02B 1/041* (2013.01); *G02B 5/208* (2013.01); *G02C 7/022* (2013.01); *G02B 1/04* (2013.01); *G02C 2202/16* (2013.01)

(58) Field of Classification Search
CPC ..... G02C 7/108; G02C 7/022; G02C 2202/16
(Continued)

(56) References Cited

U.S. PATENT DOCUMENTS 4,513,061 A * 4/1985 Kawakubo ............... C09D 5/32
                                                    428/419
4,716,234 A    12/1987 Dunks et al.
(Continued)

FOREIGN PATENT DOCUMENTS

EP    2757115 A1    7/2014
EP    2963457 A1    1/2016
(Continued)

OTHER PUBLICATIONS

International Search Report (PCT/ISA/210) dated May 20, 2014, by the Japanese Patent Office as the International Searching Authority for International Application No. PCT/JP2014/054971.
(Continued)

*Primary Examiner* — Stephone B Allen
*Assistant Examiner* — Travis Fissel
(74) *Attorney, Agent, or Firm* — Buchanan, Ingersoll & Rooney PC

(57) ABSTRACT

The optical material of the present invention contains one or more kinds of ultraviolet absorber (a) having a maximum absorption peak within a range of equal to or greater than 350 nm and equal to or less than 370 nm, in which a light transmittance of the optical material having a thickness of 2 mm satisfies the following characteristics (1) to (3),
  (1) a light transmittance at a wavelength of 410 nm is equal to or less than 10%,
(Continued)

(2) a light transmittance at a wavelength of 420 nm is equal to or less than 70%, and
(3) a light transmittance at a wavelength of 440 nm is equal to or greater than 80%.

18 Claims, 1 Drawing Sheet

(51) Int. Cl.
   *G02B 5/20* (2006.01)
   *G02C 7/02* (2006.01)
   *G02B 1/04* (2006.01)
(58) Field of Classification Search
   USPC .............. 351/159.6, 159.61, 159.62, 159.63, 351/159.65, 159.73, 159.74, 178; 568/18; 427/134, 135
   See application file for complete search history.

(56) References Cited

U.S. PATENT DOCUMENTS

| | | | |
|---|---|---|---|
| 6,187,844 | B1 | 2/2001 | Murata |
| 7,354,989 | B2* | 4/2008 | Morijiri ................. C08G 65/22 525/523 |
| 8,210,678 | B1* | 7/2012 | Farwig ..................... G02B 5/22 351/159.65 |
| 2003/0170467 | A1 | 9/2003 | Cornelius et al. |
| 2005/0243272 | A1 | 11/2005 | Mainster et al. |
| 2008/0094704 | A1 | 4/2008 | Kimura et al. |
| 2009/0029172 | A1 | 1/2009 | Isozaki |
| 2009/0225425 | A1* | 9/2009 | Jang ................... C08G 18/3876 359/581 |
| 2009/0299030 | A1* | 12/2009 | Watanabe .............. C08G 59/02 528/374 |
| 2010/0292430 | A1 | 11/2010 | Rye et al. |

FOREIGN PATENT DOCUMENTS

| | | |
|---|---|---|
| JP | H05-072504 A | 3/1993 |
| JP | 05-105772 A | 4/1993 |
| JP | 07-101151 A | 4/1995 |
| JP | 09-194536 A | 7/1997 |
| JP | 09-263694 A | 10/1997 |
| JP | 10-186291 A | 7/1998 |
| JP | 11-218602 A | 8/1999 |
| JP | 11-295502 A | 10/1999 |
| JP | 2000-147201 A | 5/2000 |
| JP | 2004-504481 A | 2/2004 |
| JP | 2004-124062 A | 4/2004 |
| JP | 2004-131652 A | 4/2004 |
| JP | 2004-513388 A | 4/2004 |
| JP | 2004-345123 A | 12/2004 |
| JP | 2007-535708 A | 12/2007 |
| JP | 2008-105225 A | 5/2008 |
| JP | 2012-173704 A | 9/2012 |
| JP | 2012-242718 A | 12/2012 |
| JP | 2013-060488 A | 4/2013 |
| KR | 10-0689867 B1 | 2/2007 |
| KR | 10-2011-0063847 A | 6/2011 |
| WO | WO 02/08664 A1 | 1/2002 |
| WO | WO 02/037167 A1 | 5/2002 |
| WO | WO 2005/111702 A1 | 11/2005 |
| WO | WO 2006/087880 A1 | 8/2006 |
| WO | WO 2008/029994 A1 | 3/2008 |
| WO | WO 2013/039114 A1 | 3/2013 |
| WO | WO 2014/133111 A1 | 9/2014 |

OTHER PUBLICATIONS

Knels et al. "Blue light stress in retinal neuronal (R28) cells is dependent on wavelength range and irradiance", European Journal of Neuroscience, vol. 34. pp. 548-558, 2011.
Extended Search Report issued by the European issued by the European Patent Office in corresponding European Patent Application No. 14757327.3 dated Jan. 7, 2016 (7 pages).
Office Action issued by the Japanese Patent Office in corresponding Japanese Patent Application No. 2015-503034 dated Mar. 1, 2016 (3 pages).
CIBA: The Optical Brighteners (Uvitex OB) product catalog, Ciba Special Chemicals, Apr. 1999, Switzerland.
T.R. Crompton: "The Determination of Ultraviolet Stabilisers in Extractants", GlobalSpec [Online], Feb. 9, 2017.
CIBA: "TINUVIN 328", Nov. 2008.
Office Action issued by the Korean Patent Office in corresponding Korean Patent Application No. 10-2015-7021391 dated Feb. 22, 2017 (7 pages).
Office Action issued by the Japanese Patent Office in corresponding Japanese Patent Application No. 2015-552544 dated Sep. 6, 2016 (1 page).
Notification of Reasons for Refusal issued by the Japanese Patent Office in related Japanese Patent Application No. 2015-552543 dated Apr. 11, 2017 (6 pages including partial English translation).
Extended Search Report issued by the European Patent Office in European Application No. 14869657.8 dated Jul. 4, 2017 (7 pages).
Notification of Reasons for Refusal issued by the Korean Intellectual Property Office in Korean Patent Application No. 10-2016-7014908 dated Jun. 14, 2017 (13 pages including partial English translation).

* cited by examiner

OPTICAL MATERIAL, COMPOSITION FOR OPTICAL MATERIAL, AND USE THEREOF

TECHNICAL FIELD

The present invention relates to an optical material, a composition for an optical material, and use thereof.

BACKGROUND ART

In the related art, a fact that exposure to ultraviolet rays exerts a negative influence on the eye is regarded as an issue. Furthermore, in recent years, a fact that blue light, which is included in natural light or in light emitted from liquid crystal displays of office machines, displays of portable devices such as smartphones or cellular phones, and the like, exerts an influence on the eye and makes the eye feel fatigue or pain has become an issue. Therefore, it is required to reduce exposure of the eye to ultraviolet rays and blue light having a relatively short wavelength of about 420 nm.

Non-Patent Document 1 describes the influence of short-wavelength blue light of about 420 nm on the eye.

In this document, damage of retinal neuronal cells (rat R28 retinal neuronal culture cells) irradiated with blue LED lights having different peak wavelengths of 411 nm and 470 nm was verified. As a result, it was found that while irradiation (4.5 $W/m^2$) of blue light having a peak wavelength at 411 nm caused death of the retinal neuronal cells within 24 hours, blue light having a peak wavelength at 470 nm caused no change in the cells even if the cells were irradiated with this light at the same dose. This result shows that in order to prevent eye injury, it is important to inhibit exposure of the eye to light having a wavelength of 400 nm to 420 nm.

Moreover, it is considered that if irradiated with blue light for a long time, the eye may suffer from fatigue or stress, and this may lead to age-related macular degeneration.

RELATED DOCUMENT

Patent Document

[Patent Document 1] Japanese Unexamined Patent Publication No. 10-186291
[Patent Document 2] Japanese Unexamined Patent Publication No. 11-218602
[Patent Document 3] Japanese Unexamined Patent Publication No. 11-295502
[Patent Document 4] Japanese Unexamined Patent Publication No. 2000-147201
[Patent Document 5] Pamphlet of International Publication No. WO2006/087880

Non-Patent Document

[Non-Patent Document 1] The European journal of neuroscience vol. 34, Iss. 4, 548-558, (2011)

DISCLOSURE OF THE INVENTION

Patent Document 1 discloses a technique for suppressing an average light transmittance within a range of equal to or greater than 300 nm and equal to or less than 400 nm by adding an ultraviolet absorber.

Patent Document 2 discloses a technique that uses at least two kinds of ultraviolet absorber differing from each other in terms of maximum absorption wavelength. Patent Document 3 discloses a technique regarding a plastic lens that does not undergo yellowing, change in refractive index, and the like even when an ultraviolet absorber is added thereto and does not experience decrease in mechanical strength. However, the techniques disclosed in the documents merely relate to spectral transmittance at 400 nm, and the documents do not include a disclosure regarding light transmittance at 420 nm and 440 nm.

Patent Document 4 discloses a technique in which a benzotriazole derivative is added as an ultraviolet absorber, and discloses an ultraviolet transmittance in a plastic lens having a thickness of 1.1 mm at a wavelength equal to or less than 400 nm.

Herein, when an ultraviolet absorber is used to cut a low-wavelength region of a wavelength of 400 nm to 420 nm, depending on the type of the ultraviolet absorber, the resin turns yellow in some cases, or alternatively, the ultraviolet absorber is precipitated without being completely dissolved in a composition for an optical material and becomes opaque in some cases.

In the technique disclosed in Patent Document 5, fine iron oxide particles are added to a composition, and consequentially, a molded product is colored in some cases. Therefore, in the field of spectacle lenses or the like that require transparency, the technique causes a problem in external appearance. Furthermore, a polycarbonate resin, which has been used as a transparent thermoplastic resin, needs to be further improved in terms of optical properties such as the refractive index or Abbe number.

The present invention includes the following.

[1] An optical material that contains one or more kinds of ultraviolet absorber (a) having a maximum absorption peak within a range of equal to or greater than 350 nm and equal to or less than 370 nm, in which a light transmittance of the optical material having a thickness of 2 mm satisfies the following characteristics (1) to (3), (1) a light transmittance at a wavelength of 410 nm is equal to or less than 10%, (2) a light transmittance at a wavelength of 420 nm is equal to or less than 70%, and (3) a light transmittance at a wavelength of 440 nm is equal to or greater than 80%.

[2] The optical material described in [1], in which the ultraviolet absorber (a) is selected from benzotriazole-based compounds.

[3] The optical material described in [1] or [2], in which the ultraviolet absorber (a) is 2-(2-hydroxy-3-t-butyl-5-methylphenyl)-chlorobenzotriazole.

[4] The optical material described in any one of [1] to [3], that contains at least one kind selected from polyurethane, polythiourethane, polysulfide, polycarbonate, poly(meth) acrylate, and polyolefin.

[5] The optical material described in any one of [1] to [4], including a lens substrate, and a film layer and a coating layer that are optionally laminated over the lens substrate.

[6] The optical material described in any one of [1] to [5], including the lens substrate, and the film layer and the coating layer that are optionally laminated over the lens substrate, in which the ultraviolet absorber (a) is contained in at least one of the lens substrate, the film layer, and the coating layer.

[7] The optical material described in any one of [1] to [6] that is obtained from a composition for an optical material containing one or more kinds of ultraviolet absorber (a) having a maximum absorption peak within a range of equal to or greater than 350 nm and equal to or less than 370 nm and a resin for an optical material (b) or a polymerizable compound (c), in which the amount of the ultraviolet absorber (a) contained in the composition is 0.3% by weight to 2% by weight with respect to the total weight of the resin for an optical material (b) or the polymerizable compound (c).

[8] The optical material described in [7], in which the ultraviolet absorber (a) is one or more kinds of compound selected from benzotriazole-based compounds.

[9] The optical material described in [7] or [8], in which the resin for an optical material (b) is at least one kind selected from polycarbonate, poly(meth)acrylate, and polyolefin.

[10] The optical material described in [7] or [8], in which the polymerizable compound (c) is a combination of a polyisocyanate compound and a polyol compound, a combination of a polyisocyanate compound and a polythiol compound, a polyepithio compound and/or a polythietane compound, or a combination of a polyepithio compound and a polythiol compound.

[11] A plastic spectacle lens comprised of the optical material described in any one of [1] to [10].

[12] A composition for an optical material including one or more kinds of ultraviolet absorber (a) having a maximum absorption peak within a range of equal to or greater than 350 nm and equal to or less than 370 nm, and a resin for an optical material (b) or a polymerizable compound (c), in which the amount of the ultraviolet absorber (a) contained in the composition is 0.3% by weight to 2% by weight with respect to the total weight of the resin for an optical material (b) or the polymerizable compound (c).

[13] The composition for an optical material described in [12], in which the ultraviolet absorber (a) is one or more kinds of compound selected from benzotriazole-based compounds.

[14] The composition for an optical material described in [12] or [13], in which the resin for an optical material (b) is at least one kind selected from polycarbonate, poly(meth)acrylate, and polyolefin.

[15] The composition for an optical material described in [12] or [13], in which the polymerizable compound (c) is a combination of a polyisocyanate compound and a polyol compound, a combination of a polyisocyanate compound and a polythiol compound, a polyepithio compound and/or a polythietane compound, or a combination of a polyepithio compound and a polythiol compound.

[16] A manufacturing method of an optical material, including a step of obtaining the composition for an optical material described in any one of [12] to [15] by mixing the ultraviolet absorber (a) with the resin for an optical material (b) or the polymerizable compound (c), and a step of curing the composition for an optical material.

[17] A molded product obtained by curing the composition for an optical material described in any one of [12] to [15].

[18] An optical material comprised of the molded product described in [17].

[19] A plastic spectacle lens including a lens substrate comprised of the molded product described in [17].

[20] A film obtained from the molded product described in [17].

[21] A coating material comprised of the composition for an optical material described in any one of [12] to [15].

[22] A plastic spectacle lens including a layer comprised of the film described in [20] over at least one surface of a lens substrate.

[23] A plastic spectacle lens including lens substrate layers over both surfaces of the film described in [20].

[24] A plastic spectacle lens including a coating layer, which is obtained by curing the coating material described in [21], over at least one surface of a lens substrate.

According to the present invention, it is possible to provide an optical material which exerts a strong effect of blocking from harmful ultraviolet rays to blue light of about 420 nm and has an excellent external appearance that is colorless and transparent. The optical material of the present invention has excellent optical characteristics such as a high refractive index and a high Abbe number, has an excellent external appearance that is colorless and transparent, and can prevent injury including eye fatigue and stress by reducing influence of harmful light on the eye. Therefore, the optical material can be suitably used particularly as a plastic spectacle lens.

DESCRIPTION OF EMBODIMENTS

Figure 1:
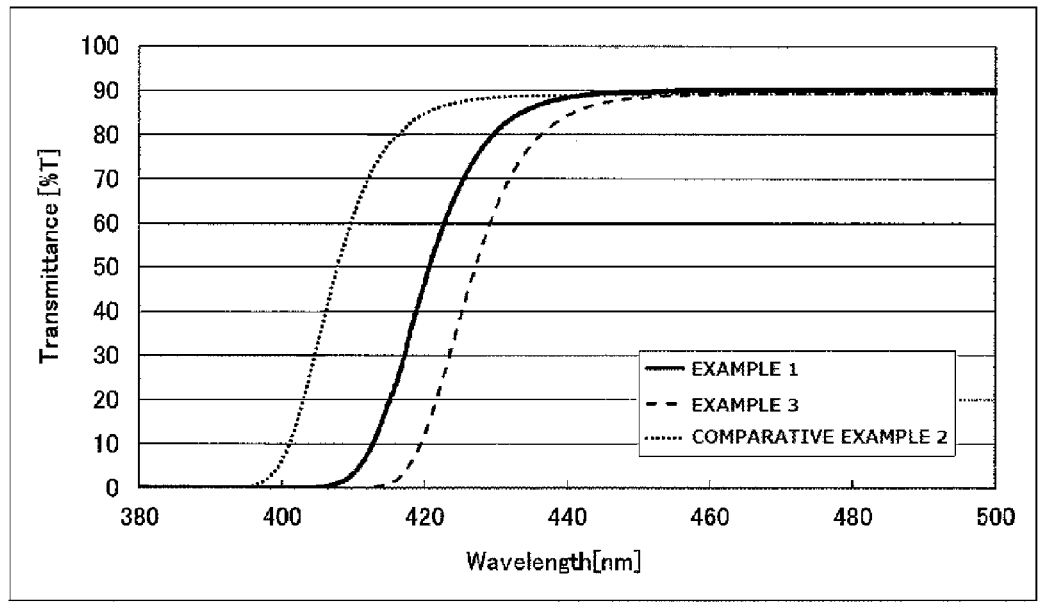
FIG. 1 is a chart showing ultraviolet-visible light spectra of lenses prepared in Examples 1 and 3 and Comparative example 2.

Hereinafter, embodiments of the present invention will be specifically described.

The optical material of the present invention contains an ultraviolet absorber (a) having a maximum absorption wavelength of equal to or greater than 350 nm and equal to or less than 370 nm, and a light transmittance of the optical material having a thickness of 2 mm satisfies the following characteristics (1) to (3).

(1) A light transmittance at a wavelength of 410 nm is equal to or less than 10%.

(2) A light transmittance at a wavelength of 420 nm is equal to or less than 70%.

(3) A light transmittance at a wavelength of 440 nm is equal to or greater than 80%.

The present inventors found that by using a specific ultraviolet absorber having a maximum absorption wavelength within a range of equal to or greater than 350 nm and equal to or less than 370 nm, an optical material that selectively absorbs light in a low-wavelength region of 400 nm to 420 nm can be obtained, and the optical material has excellent optical characteristics such as a high refractive index and a high Abbe number and has an excellent external appearance that is colorless and transparent. Based on these findings, they completed the present invention.

That is, because the optical material contains the ultraviolet absorber (a) and has a light transmittance that is within the aforementioned range at a specific wavelength, the optical material has an excellent external appearance including transparency, has excellent optical characteristics such as a high refractive index and a high Abbe number, is prevented from becoming colored, and can prevent injury including eye fatigue and stress. Furthermore, because the optical material has a light transmittance of equal to or greater than 80% at a wavelength of 440 nm, it can be obtained in the form of a colorless and transparent optical material having excellent an external appearance.

Hereinafter, embodiments of the present invention will be specifically described.

In a first embodiment, an embodiment will be described in which an optical material is prepared by using a composition for an optical material containing the ultraviolet absorber (a). In a second embodiment, an embodiment will be described in which a molded product is prepared by using a composition for an optical material not containing the ultraviolet absorber (a), and an optical material is prepared by adding the ultraviolet absorber (a) to the molded product by a predetermined method.

First Embodiment

A composition for an optical material of the present embodiment contains one or more kinds of ultraviolet absorber (a) having a maximum absorption peak within a range of equal to or greater than 350 nm and equal to or less than 370 nm, and a resin for an optical material (b) or a polymerizable compound (resin monomer) (c). Hereinafter, each of the components will be described in detail.

[Ultraviolet Absorber (a)]

The ultraviolet absorber (a) used in the present embodiment is not particularly limited as long as it has a maximum absorption wavelength within a range of equal to or greater than 350 nm and equal to or less than 370 nm when being dissolved in a chloroform solution.

As the ultraviolet absorber (a), benzotriazole-based compounds are preferably used.

In the present embodiment, as the ultraviolet absorber (a), one or more kinds of such ultraviolet absorbers are preferably used. Furthermore, the composition for an optical material may contain two or more different kinds of the ultraviolet absorber (a). Herein, any of ultraviolet absorbers constituting the ultraviolet absorber (a) has a maximum absorption peak within a range of equal to or greater than 350 nm and equal to or less than 370 nm.

The ultraviolet absorber (a) can be contained in any of a lens substrate, a film layer, and a coating layer which will be described later. As the film layer or the coating layer, it is possible to use materials having polarization properties or materials having photochromic properties.

Preferable examples of the ultraviolet absorber (a) used in the present embodiment include 2-(2-hydroxy-3-t-butyl-5-methyphenyl)-chlorobenzotriazole. Examples of commercially available products thereof include TINUVIN326 manufactured by BASF Corporation, SEESEORB703 manufactured by SHIPRO KASEI KAISHA, LTD., Viosorb550 manufactured by KYODO CHEMICAL CO., LTD., KEMISORB73 manufactured by CHEMIPRO KASEI, and the like.

[Resin for Optical Material (b) or Polymerizable Compound (c)]

In the present embodiment, the composition for an optical material contains the resin for an optical material (b) or the polymerizable compound (c). The resin for an optical material and a resin obtained from the polymerizable compound (hereinafter, all of the resins will be simply referred to as a "resin" in some cases) are preferably transparent resins.

(Resin for Optical Material (b))

As the resin for an optical material (b), polycarbonate, poly(meth)acrylate, polyolefin, cyclic polyolefin, polyallyl, polyurethane urea, a polyene-polythiol polymer, a ring-opening metathesis polymer, polyester, and an epoxy resin can be preferably used. These are materials (transparent resins) having a high degree of transparency, and can be suitably used for optical materials. At least one kind selected from polycarbonate, poly(meth)acrylate, and polyolefin can be more preferably used as the materials. These are materials having a high degree of transparency, and can be suitably used for optical materials. Herein, one kind of these materials may be used singly, or a composite material consisting of these materials may be used.

The polycarbonate can be obtained by a method of causing a reaction between an alcohol and phosgene or a reaction between an alcohol and chloroformate, or by a method of causing an ester exchange reaction of a carbonic diester compound. It is also possible to use general polycarbonate resins in the form of commercially available products. As the commercially available products, a Panlite series manufactured by Teij in Chemicals Ltd. and the like can be used. The composition for an optical material of the present embodiment can contain the polycarbonate as the resin for an optical material (b).

Examples of the poly(meth)acrylate include poly(meth)acrylates of alkane polyols such as ethylene glycol di(meth)acrylate, propylene glycol di(meth)acrylate, butylene glycol di(meth)acrylate, neopentyl glycol di(meth)acrylate, hexylene glycol di(meth)acrylate, trimethylolpropane tri(meth)acrylate, and pentaerythritol tetra(meth)acrylate; polyoxyalkane polyol poly(meth)acrylates such as diethylene glycol di(meth)acrylate, triethylene glycol di(meth)acrylate, polyethylene glycol di(meth)acrylate, dipropylene glycol di(meth)acrylate, polypropylene glycol di(meth)acrylate, dibutylene glycol di(meth)acrylate, and dipentaerythritol hexa(meth)acrylate; and the like.

The composition for an optical material of the present embodiment can contain the poly(meth)acrylate as the resin for an optical material (b).

The polyolefin is prepared by polymerizing at least one kind of olefin selected from α-olefins in the presence of a known catalyst for olefin polymerization such as a Ziegler-Natta catalyst, a metallocene catalyst, or a so-called post-metallocene catalyst. The α-olefin monomer may be composed of a single component, or may be obtained by copolymerizing multiple components.

In manufacturing the polyolefin, the polymerization reaction of the olefin can be performed by a liquid-phase polymerization method such as a solution polymerization, suspension polymerization, or bulk polymerization, a gas-phase polymerization method, or other known polymerization methods. For manufacturing the polyolefin, liquid-phase polymerization methods such as solution polymerization and suspension polymerization (slurry polymerization) are preferably used, and a suspension polymerization (slurry polymerization) method is more preferably used. For the polymerization, known conditions can be applied as temperature or pressure conditions.

The composition for an optical material of the present embodiment can contain the polyolefin as the resin for an optical material (b).

The cyclic polyolefin is prepared by polymerizing at least one kind of cyclic olefin selected from cyclic olefins in the presence of a known catalyst for olefin polymerization. The cyclic polyolefin may be composed of a single monomer, or may be obtained by copolymerizing multiple components. As the cyclic polyolefin, Apel (trademark) manufactured by Mitsui Chemicals, Inc. can be suitably used because it has a high degree of transparency.

The polyallyl is manufactured by polymerizing at least one kind of allyl group-containing monomer selected from allyl group-containing monomers in the presence of a known polymerization catalyst generating a radical. As the allyl group-containing monomers, allyl diglycol carbonates or diallyl phthalates are commercially available in general, and these can be suitably used.

The polyurethane urea is a product obtained by reacting a polyurethane prepolymer and a diamine curing agent, and typical examples thereof include TRIVEX (trademark) available from PPG Industries, Inc. A polyurethane polyurea is a material having a high degree of transparency and can be suitably used.

The polyene-polythiol polymer is produced by addition polymerization or ethylene chain-like polymerization of a polyene compound having two or more ethylenic functional groups in a one molecule and a polythiol compound having two or more thiol groups in a one molecule.

Examples of the polyene compound in the polyene-polythiol polymer include allyl alcohol derivatives, esters of (meth)acrylic acid and polyol, urethane acrylate, divinyl benzene, and the like. At least one kind of these can be used. Examples of the allyl alcohol derivatives include triallyl isocyanurate, triallyl cyanurate, diallyl maleate, diallyl fumarate, diallyl adipate, diallyl phthalate, triallyl trimellitate, tetraallyl pyromellitate, glycerin diallyl ether, trimethylol propane diallyl ether, pentaerythritol diallyl ether, sorbitol diallyl ether, and the like. Examples of the polyol in the esters of a (meth)acrylic acid and a polyol include ethylene glycol, propylene glycol, 1,4-butanediol, 1,6-hexanediol, glycerin, trimethylol propane, pentaerythritol, sorbitol, and the like.

The ring-opening metathesis polymer is a polymer obtained by performing ring-opening polymerization of cyclic olefins by using a catalyst. The cyclic olefins that can be subjected to the ring-opening polymerization are not particularly limited as long as they have a cyclic structure, and examples thereof generally include monocyclic cycloalkenes, monocyclic cycloalkadienes, polycyclic cycloalkenes, and polycyclic cycloalkadienes having 3 to 40 carbon atoms. Specific examples of the monocyclic cycloalkenes include cyclobutene, cyclopentene, cyclohexene, cyclooctene, and the like. Examples of the monocyclic cycloalkadienes include cyclobutadiene, 1,3-cyclopentadiene, 1,3-cyclohexadiene, 1,4-cyclohexadiene, 1,5-cyclooctadiene, and the like. Examples of the polycyclic cycloalkenes include norbornene, tetracyclo[6.2.1.1$^{3,6}$.0$^{2,7}$]dodec-4-ene, and the like. Examples of the polycyclic cycloalkadienes include norbornadiene, dicyclopentadiene, and the like. These may be substituted with oxygen, sulfur, halogen, or the like, and may be hydrogenated. Preferable examples thereof include ARTON (trademark) of JSR Corporation and the like.

The polyester is obtained by condensation polymerization performed in the presence of a known catalyst for manufacturing polyester, such as Lewis acid catalyst represented by an antimony or germanium compound, an organic acid, or an inorganic acid. Specifically, the polyester refers to a polymer composed of At least one kind selected from polyvalent carboxylic acids including a dicarboxylic acid and ester-forming derivatives thereof and one, two, or more kinds selected from polyols including glycol, a polymer composed of a hydroxycarboxylic acid and an ester-forming derivative thereof, or a polymer composed of a cyclic ester.

Examples of the dicarboxylic acid include saturated aliphatic dicarboxylic acids, such as oxalic acid, malonic acid, succinic acid, glutaric acid, adipic acid, pimelic acid, suberic acid, azelaic acid, sebacic acid, decanedicarboxylic acid, dodecanedicarboxylic acid, tetradecanedicarboxylic acid, hexadecanedicarboxylic acid, 1,3-cyclobutanedicarboxylic acid, 1,3-cyclopentanedicarboxylic acid, 1,2-cyclohexanedicarboxylic acid, 1,3-cyclohexanedicarboxylic acid, 1,4-cyclohexanedicarboxylic acid, 2,5-norbornanedicarboxylic acid, and dimer acids, and ester-forming derivatives thereof; unsaturated aliphatic dicarboxylic acids, such as fumaric acid, maleic acid, and itaconic acid, and ester-forming derivatives thereof; and aromatic dicarboxylic acids, such as orthophthalic acid, isophthalic acid, terephthalic acid, 5-(alkaline metal)sulfoisophthalic acid, diphenic acid, 1,3-naphthalene dicarboxylic acid, 1,4-naphthalene dicarboxylic acid, 1,5-naphthalene dicarboxylic acid, 2,6-naphthalene dicarboxylic acid, 2,7-naphthalene dicarboxylic acid, 4,4'-biphenyldicarboxylic acid, 4,4'-biphenylsulfone dicarboxylic acid, 4,4'-biphenylether dicarboxylic acid, 1,2-bis(phenoxy)ethane-p,p'-dicarboxylic acid, pamoic acid, and anthracene dicarboxylic acid, and ester-forming derivatives thereof. Among these dicarboxylic acids, terephthalic acid and naphthalene dicarboxylic acid are preferable, and 2,6-naphthalene dicarboxylic acid is particularly preferable, since these makes the obtained polyester exhibit excellent properties and the like. The polyester optionally contains other dicarboxylic acids as constituents. Examples of the polyvalent carboxylic acids other than these dicarboxylic acids include ethane tricarboxylic acid, propane tricarboxylic acid, butane tetracarboxylic acid, pyromellitic acid, trimellitic acid, trimesic acid, 3,4,3',4'-biphenyltetracarboxylic acid, ester-forming derivatives thereof, and the like.

Examples of the glycol include aliphatic glycols such as ethylene glycol, 1,2-propylene glycol, 1,3-propylene glycol, diethylene glycol, triethylene glycol, 1,2-butylene glycol, 1,3-butylene glycol, 2,3-butylene glycol, 1,4-butylene glycol, 1,5-pentanediol, neopentyl glycol, 1,6-hexanediol, 1,2-cyclohexanediol, 1,3-cyclohexanediol, 1,4-cyclohexanediol, 1,2-cyclohexanedimethanol, 1,3-cyclohexanedimethanol, 1,4-cyclohexanedimethanol, 1,4-cyclohexanediethanol, 1,10-decamethylene glycol, 1,12-dodecanediol, polyethylene glycol, polytrimethylene glycol, and polytetramethylene glycol; and aromatic glycols such as hydroquinone, 4,4'-dihydroxybisphenol, 1,4-bis(β-hydroxyethoxy)benzene, 1,4-bis(β-hydroxyethoxyphenyl)sulfone, bis(p-hydroxyphenyl)ether, bis(p-hydroxyphenyl)sulfone, bis(p-hydroxyphenyl)methane, 1,2-bis(p-hydroxyphenyl)ethane, bisphenol A, bisphenol C, 2,5-naphthalenediol, and glycols obtained by adding ethylene oxide to the above glycols.

Among these glycols, ethylene glycol, 1,3-propylene glycol, 1,4-butylene glycol, and 1,4-cyclohexane dimethanol are preferable. Examples of polyols other than these glycols include trimethylolmethane, trimethylolethane, trimethylolpropane, pentaerythritol, glycerol, hexanetriol, and the like.

As the polyester, polyethylene terephthalate, polybutylene terephthalate, polypropylene terephthalate, poly(1,4-cyclohexanedimethyleneterephthalte), polyethylene naphthalate, polybutylene naphthalate, polypropylene naphthalate, and copolymers thereof are preferable.

The epoxy resin is a resin obtained by ring-opening polymerization of an epoxy compound. Examples of the epoxy compound include phenol-based epoxy compounds obtained by a condensation reaction between an epihalohydrin compound and a polyvalent phenol compound such as bisphenol A glycidyl ether or bisphenol F glycidyl ether; alcohol-based epoxy compounds obtained by condensation between an epihalohydrin compound and a polyol compound such as hydrogenated bisphenol A glycidyl ether, hydrogenated bisphenol F glycidyl ether, or cyclohexanedimethanol; glycidyl ester-based epoxy compounds obtained by condensation between an epihalohydrin compound and a polyvalent organic compound such as 3,4-epoxycyclohexylmethyl-3',4'-epoxycyclohexane carboxylate or 1,2-hexahydrophthalic acid diglycidyl ester; amine-based epoxy compounds obtained be condensation between a primary and secondary amine compounds and an epihalohydrin compound; and the like. The examples also include aliphatic polyvalent epoxy compounds such as vinylcyclohexene diepoxide like 4-vinyl-1-cyclohexane diepoxide, and the like.

(Polymerizable Compound (c))

In the present embodiment, the composition for an optical material can contain the polymerizable compound (c), and as the resin obtained from the polymerizable compound (c), polyurethane, polythiourethane, polysulfide, and the like can be preferably used. These are materials (transparent resins) having a high degree of transparency, and can be suitably used for optical materials.

The polyurethane is obtained from a polyisocyanate compound and a polyol compound as the polymerizable compound (c). The polythiourethane is obtained from a polyisocyanate compound and a polythiol compound as the polymerizable compound (c). The composition for an optical material can contain the following polymerizable compound (c) constituting those resins.

Examples of the polyisocyanate compound include aliphatic polyisocyanate compounds such as hexamethylene diisocyanate, 2,2,4-trimethylhexane diisocyanate, 2,4,4-trimethylhexamethylene diisocyanate, lysine diisocyanatomethyl ester, lysine triisocyanate, m-xylylene diisocyanate, α,α,α',α'-tetramethylxylylene diisocyanate, bis(isocyanatomethyl)naphthalene, mesitylene triisocyanate, bis(isocyanatomethyl)sulfide, bis(isocyanatoethyl)sulfide, bis(isocyanatomethyl)disulfide, bis(isocyanatoethyl)disulfide, bis(isocyanatomethylthio)methane, bis(isocyanatoethylthio)methane, bis(isocyanatoethylthio)ethane, and bis(isocyanatomethylthio)ethane; alicyclic polyisocyanate compounds such as isophorone diisocyanate, bis(isocyanatomethyl)cyclohexane, dicyclohexylmethane-4,4'-diisocyanate, cyclohexane diisocyanate, methyl cyclohexane diisocyanate, dicyclohexyldimethyl methane isocyanate, 2,5-bis(isocyanatomethyl)bicyclo-[2.2.1]-heptane, 2,6-bis(isocyanatomethyl)bicyclo-[2.2.1]-heptane, 3,8-bis(isocyanatomethyl)tricyclodecane, 3,9-bis(isocyanatomethyl)tricyclodecane, 4,8-bis(isocyanatomethyl)tricyclodecane, and 4,9-bis(isocyanatomethyl)tricyclodecane; aromatic polyisocyanate compounds such as diphenylsulfide-4,4'-diisocyanate; heterocyclic polyisocyanate compounds such as 2,5-diisocyanatothiophene, 2,5-bis(isocyanatomethyl)thiophene, 2,5-diisocyanatotetrahydrothiophene, 2,5-bis(isocyanatomethyl)tetrahydrothiophene, 3,4-bis(isocyanatomethyl)tetrahydrothiophene, 2,5-diisocyanato-1,4-dithiane, 2,5-bis(isocyanatomethyl)-1,4-dithiane, 4,5-diisocyanato-1,3-dithiolane, and 4,5-bis(isocyanatomethyl)-1,3-dithiolane; and the like.

The polyol compound includes one or more kinds of aliphatic or alicyclic alcohols. Specific examples thereof include linear or branched aliphatic alcohols, alicyclic alcohols, alcohols obtained by adding ethylene oxide, propylene oxide, or ε-caprolactone to those alcohols, and the like.

Examples of the linear or branched aliphatic alcohols include ethylene glycol, diethylene glycol, triethylene glycol, propylene glycol, dipropylene glycol, tripropylene glycol, 1,3-propanediol, 2,2-dimethyl-1,3-propanediol, 2,2-diethyl-1,3-propanediol, 1,2-butanediol, 1,3-butanediol, 1,4-butanediol, 3-methyl-1,3-butanediol, 1,2-pentanediol, 1,3-pentanediol, 1,5-pentanediol, 2,4-pentanediol, 2-methyl-2,4-pentanediol, 3-methyl-1,5-pentanediol, 1,6-hexanediol, 2,5-hexanediol, glycerol, diglycerol, polyglycerol, trimethylolpropane, pentaerythritol, di(trimethylolpropane), and the like.

Examples of the alicyclic alcohols include 1,2-cyclopentanediol, 1,3-cyclopentanediol, 3-methyl-1,2-cyclopentanediol, 1,2-cyclohexanediol, 1,3-cyclohexanediol, 1,4-cyclohexanediol, 4,4'-bicyclohexanol, 1,4-cyclohexanedimethanol, and the like.

Furthermore, compounds obtained by adding ethylene oxide, propylene oxide, or ε-caprolactone to the aforementioned alcohols may be used. Examples thereof include ethylene oxide adducts of glycerol, ethylene oxide adducts of trimethylolpropane, ethylene oxide adducts of pentaerythritol, propylene oxide adducts of glycerol, propylene oxide adducts of trimethylolpropane, propylene oxide adducts of pentaerythritol, caprolactone-modified glycerol, caprolactone-modified trimethylolpropane, caprolactone-modified pentaerythritol, and the like.

Examples of the polythiol compound include aliphatic polythiol compounds such as methane dithiol, 1,2-ethanedithiol, 1,2,3-propanetrithiol, 1,2-cyclohexanedithiol, bis(2-mercaptoethyl)ether, tetrakis(mercaptomethyl)methane, diethylene glycol bis(2-mercaptoacetate), diethylene glycol bis(3-mercaptopropionate), ethylene glycol bis(2-mercaptoacetate), ethylene glycol bis(3-mercaptopropionate), trimethylolpropane tris(2-mercaptoacetate), trimethylolpropane tris(3-mercaptopropionate), trimethylolethane tris(2-mercaptoacetate), trimethylolethane tris(3-mercaptopropionate), pentaerythritol tetrakis(2-mercaptoacetate), pentaerythritol tetrakis(3-mercaptopropionate), bis(mercaptomethyl)sulfide, bis(mercaptomethyl)disulfide, bis(mercaptoethyl)sulfide, bis(mercaptoethyl)disulfide, bis(mercaptopropyl)sulfide, bis(mercaptomethylthio)methane, bis(2-mercaptoethylthio)methane, bis(3-mercaptopropylthio)methane, 1,2-bis(mercaptomethylthio)ethane, 1,2-bis(2-mercaptoethylthio)ethane, 1,2-bis(3-mercaptopropylthio)ethane, 1,2,3-tris(mercaptomethylthio)propane, 1,2,3-tris(2-mercaptoethylthio)propane, 1,2,3-tris(3-mercaptopropylthio)propane, 4-mercaptomethyl-1,8-dimercapto-3,6-dithiaoctane, 5,7-dimercaptomethyl-1,11-dimercapto-3,6,9-trithiaundecane, 4,7-dimercaptomethyl-1,11-dimercapto-3,6,9-trithiaundecane, 4,8-dimercaptomethyl-1,11-dimercapto-3,6,9-trithiaundecane, tetrakis(mercaptomethylthiomethyl)methane, tetrakis(2-mercaptoethylthiomethyl)methane, tetrakis(3-mercaptopropylthiomethyl)methane, bis(2,3-dimercaptopropyl)sulfide, 2,5-dimercaptomethyl-1,4-dithiane, 2,5-dimercapto-1,4-dithiane, 2,5-dimercaptomethyl-2,5-dimethyl-1,4-dithiane, esters of thioglycolic acids thereof and mercaptopropionic acids, hydroxymethyl sulfide bis(2-mercaptoacetate), hydroxymethyl sulfide bis(3-mercaptopropionate), hydroxyethyl sulfide bis(2-mercaptoacetate), hydroxyethyl sulfide bis(3-mercaptopropionate), hydroxymethyl disulfide bis(2-mercaptoacetate), hydroxymethyl disulfide bis(3-mercaptopropionate), hydroxyethyl disulfide bis(2-mercaptoacetate), hydroxyethyl disulfide bis(3-mercaptopropionate), 2-mercaptoethyl ether bis(2-mercaptoacetate), 2-mercaptoethyl ether bis(3-mercaptopropionate), thiodiglycolic acid bis(2-mercaptoethylester), thiodipropionic acid bis(2-mercaptoethylester), dithiodiglycolic acid bis(2-mercaptoethylester), dithiodipropionic acid bis(2-mercaptoethylester), 1,1,3,3-tetrakis(mercaptomethylthio)propane, 1,1,2,2-tetrakis(mercaptomethylthio)ethane, 4,6-bis(mercaptomethylthio)-1,3-dithiane, tris(mercaptomethylthio)methane, and tris(mercaptoethylthio)methane; aromatic polythiol compounds such as 1,2-dimercaptobenzene, 1,3-dimercaptobenzene, 1,4-dimercaptobenzene, 1,2-bis(mercaptomethyl)benzene, 1,3-bis(mercaptomethyl)benzene, 1,4-bis(mercaptomethyl)benzene, 1,2-bis(mercaptoethyl)benzene, 1,3-bis(mercaptoethyl)benzene, 1,4-bis(mercaptoethyl)benzene, 1,3,5-trimercaptobenzene, 1,3,5-tris(mercaptomethyl)benzene, 1,3,5-tris(mercaptomethyleneoxy)benzene, 1,3,5-tris (mercaptoethyleneoxy)benzene, 2,5-toluenedithiol, 3,4-toluenedithiol, 1,5-naphthalenedithiol, and 2,6-naphthalenedithiol; heterocyclic polythiol compounds such as 2-methylamino-4,6-dithiol-sym-triazine, 3,4-thiophenedithiol, bismuthiol, 4,6 bis(mercaptomethylthio)-1,3-dithiane, and 2-(2,2-bis(mercaptomethylthio)ethyl)-1,3-dithietane; and the like.

In the present embodiment, when the polyurethane or polythiourethane are prepared, a polymerization catalyst may or may not be used. Furthermore, optional additives such as an internal release agent and a bluing agent may be used.

The polysulfide can be obtained by a method of performing ring-opening polymerization of a polyepithio compound or a polythietane compound as the polymerizable compound (c), or can be obtained from a polyepithio compound and a polythiol compound. The composition for an optical material can contain the following polymerizable compound (c) constituting those resins.

Examples of the polyepithio compound include epithioethylthio compounds such as bis(1,2-epithioethyl)sulfide, bis(1,2-epithioethyl)disulfide, bis(epithioethylthio)methane, bis(epithioethylthio)benzene, bis[4-(epithioethylthio)phenyl]sulfide, and bis[4-(epithioethylthio)phenyl]methane; chain-like aliphatic 2,3-epithiopropylthio compounds such as bis(2,3-epithiopropyl)sulfide, bis(2,3-epithiopropyl)disulfide, bis(2,3-epithiopropylthio)methane, 1,2-bis(2,3-epithiopropylthio)ethane, 1,2-bis(2,3-epithiopropylthio)propane, 1,3-bis(2,3-epithiopropylthio)propane, 1,3-bis(2,3-epithiopropylthio)-2-methylpropane, 1,4-bis(2,3-epithiopropylthio)butane, 1,4-bis(2,3-epithiopropylthio)-2-methylbutane, 1,3-bis(2,3-epithiopropylthio)butane, 1,5-bis(2,3-epithiopropylthio)pentane, 1,5-bis(2,3-epithiopropylthio)-2-methylpentane, 1,5-bis(2,3-epithiopropylthio)-3-thiapentane, 1,6-bis(2,3-epithiopropylthio)hexane, 1,6-bis(2,3-epithiopropylthio)-2-methylhexane, 1,8-bis(2,3-epithiopropylthio)-3,6-dithiaoctane, 1,2,3-tris(2,3-epithiopropylthio)propane, 2,2-bis(2,3-epithiopropylthio)-1,3-bis(2,3-epithiopropylthiomethyl)propane, 2,2-bis(2,3-epithiopropylthiomethyl)-1-(2,3-epithiopropylthio)butane, 1,5-bis(2,3-epithiopropylthio)-2-(2,3-epithiopropylthiomethyl)-3-thiapentane, 1,5-bis(2,3-epithiopropylthio)-2,4-bis(2,3-epithiopropylthiomethyl)-3-thiapentane, 1-(2,3-epithiopropylthio)-2,2-bis(2,3-epithiopropylthiomethyl)-4-thiahexane, 1,5,6-tris(2,3-epithiopropylthio)-4-(2,3-epithiopropylthiomethyl)-3-thiahexane, 1,8-bis(2,3-epithiopropylthio)-4-(2,3-epithiopropylthiomethyl)-3,6-dithiaoctane, 1,8-bis(2,3-epithiopropylthio)-4,5-bis(2,3-epithiopropylthiomethyl)-3,6-dithiaoctane, 1,8-bis(2,3-epithiopropylthio)-4,4-bis(2,3-epithiopropylthiomethyl)-3,6-dithiaoctane, 1,8-bis(2,3-epithiopropylthio)-2,5-bis(2,3-epithiopropylthiomethyl)-3,6-dithiaoctane, 1,8-bis(2,3-epithiopropylthio)-2,4,5-tris(2,3-epithiopropylthiomethyl)-3,6-dithiaoctane, 1,1,1-tris[[2-(2,3-epithiopropylthio)ethyl]thiomethyl]-2-(2,3-epithiopropylthio)ethane, 1,1,2,2-tetrakis[[2-(2,3-epithiopropylthio)ethyl]thiomethyl]ethane, 1,11-bis(2,3-epithiopropylthio)-4,8-bis(2,3-epithiopropylthiomethyl)-3,6,9-trithiaundecane, 1,11-bis(2,3-epithiopropylthio)-4,7-bis(2,3-epithiopropylthiomethyl)-3,6,9-trithiaundecane, and 1,11-bis(2,3-epithiopropylthio)-5,7-bis(2,3-epithiopropylthiomethyl)-3,6,9-trithiaundecane; cyclicaliphatic 2,3-epithiopropylthio compounds such as 1,3-bis(2,3-epithiopropylthio)cyclohexane, 1,4-bis(2,3-epithiopropylthio)cyclohexane, 1,3-bis(2,3-epithiopropylthiomethyl)cyclohexane, 1,4-bis(2,3-epithiopropylthiomethyl)cyclohexane, 2,5-bis(2,3-epithiopropylthiomethyl)-1,4-dithiane, 2,5-bis[[2-(2,3-epithiopropylthio)ethyl]thiomethyl]-1,4-dithiane, and 2,5-bis(2,3-epithiopropylthiomethyl)-2,5-dimethyl-1,4-dithiane; aromatic 2,3-epithiopropylthio compounds such as 1,2-bis(2,3-epithiopropylthio)benzene, 1,3-bis(2,3-epithiopropylthio)benzene, 1,4-bis(2,3-epithiopropylthio)benzene, 1,2-bis(2,3-epithiopropylthiomethyl)benzene, 1,3-bis(2,3-epithiopropylthiomethyl)benzene, 1,4-bis(2,3-epithiopropylthiomethyl)benzene, bis[4-(2,3-epithiopropylthio)phenyl]methane, 2,2-bis[4-(2,3-epithiopropylthio)phenyl]propane, bis[4-(2,3-epithiopropylthio)phenyl]sulfide, bis[4-(2,3-epithiopropylthio)phenyl]sulfone, and 4,4'-bis(2,3-epithiopropylthio)biphenyl; chain-like aliphatic 2,3-epithiopropyloxy compounds such as bis(2,3-epithiopropyl) ether, bis(2,3-epithiopropyloxy)methane, 1,2-bis(2,3-epithiopropyloxy)ethane, 1,2-bis(2,3-epithiopropyloxy)propane, 1,3-bis(2,3-epithiopropyloxy)propane, 1,3-bis(2,3-epithiopropyloxy)-2-methyl propane, 1,4-bis(2,3-epithiopropyloxy)butane, 1,4-bis(2,3-epithiopropyloxy)-2-methyl butane, 1,3-bis(2,3-epithiopropyloxy)butane, 1,5-bis(2,3-epithiopropyloxy)pentane, 1,5-bis(2,3-epithiopropyloxy)-2-methyl pentane, 1,5-bis(2,3-epithiopropyloxy)-3-thiapentane, 1,6-bis(2,3-epithiopropyloxy)hexane, 1,6-bis(2,3-epithiopropyloxy)-2-methyl hexane, 1,8-bis(2,3-epithiopropyloxy)-3,6-dithiaoctane, 1,2,3-tris(2,3-epithiopropyloxy)propane, 2,2-bis(2,3-epithiopropyloxy)-1,3-bis(2,3-epithiopropyloxymethyl)propane, 2,2-bis(2,3-epithiopropyloxymethyl)-1-(2,3-epithiopropyloxy)butane, 1,5-bis(2,3-epithiopropyloxy)-2-(2,3-epithiopropyloxymethyl)-3-thiapentane, 1,5-bis(2,3-epithiopropyloxy)-2,4-bis(2,3-epithiopropyloxymethyl)-3-thiapentane, 1-(2,3-epithiopropyloxy)-2,2-bis(2,3-epithiopropyloxymethyl)-4-thiahexane, 1,5,6-tris(2,3-epithiopropyloxy)-4-(2,3-epithiopropyloxymethyl)-3-thiahexane, 1,8-bis(2,3-epithiopropyloxy)-4-(2,3-epithiopropyloxymethyl)-3,6-dithiaoctane, 1,8-bis(2,3-epithiopropyloxy)-4,5-bis(2,3-epithiopropyloxymethyl)-3,6-dithiaoctane, 1,8-bis(2,3-epithiopropyloxy)-4,4-bis(2,3-epithiopropyloxymethyl)-3,6-dithiaoctane, 1,8-bis(2,3-epithiopropyloxy)-2,5-bis(2,3-epithiopropyloxymethyl)-3,6-dithiaoctane, 1,8-bis(2,3-epithiopropyloxy)-2,4,5-tris(2,3-epithiopropyloxymethyl)-3,6-dithiaoctane, 1,1,1-tris[[2-(2,3-epithiopropyloxy)ethyl]thiomethyl]-2-(2,3-epithiopropyloxy)ethane, 1,1,2,2-tetrakis[[2-(2,3-epithiopropyloxy)ethyl]thiomethyl]ethane, 1,11-bis(2,3-epithiopropyloxy)-4,8-bis(2,3-epithiopropyloxymethyl)-3,6,9-trithiaundecane, 1,11-bis(2,3-epithiopropyloxy)-4,7-bis(2,3-epithiopropyloxymethyl)-3,6,9-trithiaundecane, and 1,11-bis(2,3-epithiopropyloxy)-5,7-bis(2,3-epithiopropyloxymethyl)-3,6,9-trithiaundecane; cyclic aliphatic 2,3-epithiopropyloxy compounds such as 1,3-bis(2,3-epithiopropyloxy)cyclohexane, 1,4-bis(2,3-epithiopropyloxy)cyclohexane, 1,3-bis(2,3-epithiopropyloxymethyl)cyclohexane, 1,4-bis(2,3-epithiopropyloxymethyl)cyclohexane, 2,5-bis(2,3-epithiopropyloxymethyl)-1,4-dithiane, 2,5-bis[[2-(2,3-epithiopropyloxy)ethyl]thiomethyl]-1,4-dithiane, and 2,5-bis(2,3-epithiopropyloxymethyl)-2,5-dimethyl-1,4-dithiane; aromatic 2,3-epithiopropyloxy compounds such as 1,2-bis(2,3-epithiopropyloxy)benzene, 1,3-bis(2,3-epithiopropyloxy)benzene, 1,4-bis(2,3-epithiopropyloxy)benzene, 1,2-bis(2,3-epithiopropyloxymethyl)benzene, 1,3-bis(2,3-epithiopropyloxymethyl)benzene, 1,4-bis(2,3-epithiopropyloxymethyl)benzene, bis[4-(2,3-epithiopropyloxy)phenyl]methane, 2,2-bis[4-(2,3-epithiopropyloxy)phenyl]propane, bis[4-(2,3-epithiopropyloxy)phenyl]sulfide, bis[4-(2,3- epithiopropyloxy)phenyl]sulfone, and 4,4'-bis(2,3-epithiopropyloxy)biphenyl; and the like.

As the polythietane compound, metal-containing thietane compounds or non-metallic thietane compounds can be used.

As disclosed in WO2005-95490 or Japanese Unexamined Patent Publication No. 2003-327583, these polythietane compounds contain one or more thietanyl groups in a molecule. Among the polythietane compounds, compounds having two or more thietanyl groups in total are preferable, and examples thereof include sulfide-based thietane compounds such as bisthietanyl sulfide, bis(3-thietanylthio)disulfide, bis(3-thietanylthio)methane, and 3-(((3'-thietanylthio)methylthio)methylthio)thietane; polysulfide-based thietane compounds such as bis(3-thietanyl)disulfide, bis(3-thietanyl)trisulfide, bis(3-thietanyl)tetrasulfide, and bis(3-thietanyl)pentasulfide; and the like.

The polymerizable compound (c) is preferably a combination of a polyisocyanate compound and a polyol compound, a combination of a polyisocyanate compound and a polythiol compound, a polyepithio compound and/or a polythietane compound, or a combination of a polyepithio compound and a polythiol compound.

<Composition for Optical Material>

Next, the composition for an optical material of the present embodiment will be specifically described.

The composition for an optical material of the present embodiment contains one or more kinds of ultraviolet absorber (a) having a maximum absorption peak within a range of equal to or greater than 350 nm and equal to or less than 370 nm, and a resin for an optical material (b) or a polymerizable compound (resin monomer) (c).

The amount of the ultraviolet absorber (a) contained in the composition can be 0.3% by weight to 2% by weight, preferably 0.3% by weight to 1.5% by weight, and more preferably 0.3% by weight to 1.2% by weight, with respect to the total weight of the resin for an optical material (b) or the polymerizable compound (c).

When the composition for an optical material containing the ultraviolet absorber (a), which have a maximum absorption peak within a predetermined rang, in an amount within the aforementioned range is used, it is possible to obtain an optical material satisfying the aforementioned characteristics (1) to (3) of light transmittance at a specific wavelength.

The optical material obtained from the composition for an optical material of the present embodiment has excellent transparency, is inhibited from being colored, and can prevent injury including eye fatigue or stress. Particularly, because the light transmittance thereof at 440 nm is equal to or greater than 80%, the optical material can be obtained in the form of a colorless and transparent optical material having excellent external appearance.

The composition for an optical material of the present embodiment may further contain an internal release agent, a resin-modifying agent, a light stabilizer, a bluing agent, and the like as other components. Moreover, the composition for an optical material can contain known ultraviolet absorbers having a maximum absorption peak that is not within a range of equal to or greater than 350 nm and equal to or less than 370 nm, in addition to the ultraviolet absorber (a).

(Other Components)
(Internal Release Agent)

As the internal release agent, acidic phosphoric acid esters can be used. Examples of the acidic phosphoric acid esters include a phosphoric acid monoester and a phosphoric acid diester. One kind thereof can be used singly, or two or more kinds thereof can be used by being mixed with each other.

For example, it is possible to use ZelecUN manufactured by Stepan Company, internal release agents for MR manufactured by Mitsui Chemicals, Inc., a JP series manufactured by JOHOKU CHEMICAL CO., LTD., a Phosphanol series manufactured by TOHO Chemical Industry Co., Ltd., an AP or DP series manufactured by DAIHACHI CHEMICAL INDUSTRY CO., LTD., and the like.

(Resin-Modifying Agent)

Furthermore, in order to adjust various properties of the obtained resin, such as optical properties, impact resistance, and specific gravity, and to adjust viscosity or pot life of the composition, a resin-modifying agent can be added to the polymerizable composition of the present invention, within a range that does not diminish the effects of the present invention.

Examples of the resin-modifying agent include olefin compounds and the like including episulfide compounds, alcohol compounds, amine compounds, epoxy compounds, organic acids and anhydrides thereof, and (meth)acrylate compounds.

(Light Stabilizer)

As the light stabilizer, hindered amine-based compounds can be used. Examples of commercially available products of the hindered amine compounds include Lowilite76 and Lowilite92 manufactured by Chemtura Corporation, Tinuvin144, Tinuvin292, and Tinuvin765 manufactured by BASF Corporation, Adeka Stab LA-52 and LA-72 manufactured by ADEKA CORPORATION, JF-95 manufactured by JOHOKU CHEMICAL CO., LTD., and the like.

(Bluing Agent)

Examples of the bluing agent include substances that have an absorption band in a wavelength range from orange to yellow within a visible light region and functions to adjust the color of an optical material formed of a resin. More specifically, the bluing agent contains substances that are blue and violet in color.

The composition for an optical material can be obtained by mixing the aforementioned components together by a predetermined method.

The respective components in the composition can be mixed in known order by a known method without particular limitation, as long as the components can be uniformly mixed together. Examples of the known method include a method of preparing a master batch containing additives in a predetermined amount and dispersing and dissolving the master batch in a solvent, and the like. For example, in the case of the polyurethane resin, a method of preparing a master batch by dispersing and dissolving additives in the polyisocyanate compound, and the like can be used.

In the present embodiment, in order to obtain a polyurethane and polythiourethane, a polymerization catalyst may or may not be used.

Specifically, the optical material of the present embodiment can be obtained by a method of curing the composition for an optical material containing the ultraviolet absorber (a) and the resin for an optical material (b) or by a method of mixing the composition for an optical material containing the ultraviolet absorber (a) and the polymerizable compound (c) and then polymerizing the composition.

<Use>

Next, the use of the optical material of the present embodiment will be described.

The present embodiment is characterized in that it found that the optical material cuts the light having a wavelength of 400 nm to 420 nm, has a high degree of transparency, and is balanced well in terms of properties by containing a specific ultraviolet absorber (a) in the optical material.

Moreover, the present embodiment is characterized in that it found that because the optical material cuts the light having a wavelength of 400 nm to 420 nm, the optical material further reduces the likelihood of injury including eye fatigue and stress.

The optical material can be used for, for example, various plastic lenses such as plastic spectacle lenses, goggles, spectacle lenses for vision correction, lenses for imaging apparatus, Fresnel lenses for liquid crystal projector, lenticular lenses, and contact lenses, sealants for light emitting diode (LED), optical waveguides, optical adhesives used for bonding of optical lenses or optical waveguides, antireflection films used for optical lenses and the like, transparent coating used for members (a substrate, a light guide plate, a film, a sheet, and the like) of liquid crystal display devices, sheets or films stuck to the front glass of cars or to helmet for motorcycles, transparent substrates, and the like.

When the optical material has a thickness of 2 mm, the light transmittance thereof at a wavelength of 440 nm is equal to or greater than 80% and preferably equal to or greater than 85%; the light transmittance thereof at a wavelength of 420 nm is equal to or less than 70% and preferably equal to or less than 50%; and the light transmittance thereof at a wavelength of 410 nm is equal to or less than 10% and preferably equal to or less than 5%. When the light transmittance is within the above range, the optical material exerts a strong effect of blocking from harmful ultraviolet rays to blue light of about 420 nm, and has excellent external appearance that is colorless and transparent. Moreover, when the light transmittance at 440 nm is equal to or greater than 80%, a colorless and transparent molded product (optical material) having excellent external appearance can be obtained. Herein, the ranges of the numerical values can be arbitrarily combined.

Typical examples of the optical material of the present embodiment include an optical material constituted with a lens substrate, an optical material constituted with a lens substrate and a film layer, an optical material constituted with a lens substrate and a coating layer, and an optical material constituted with a lens substrate, a film layer, and a coating layer. The ultraviolet absorber (a) can be contained in any one of the lens substrate, the film layer, and the coating layer.

Specific examples of the optical material of the present embodiment include an optical material constituted only with the lens substrate; an optical material in which a film layer is laminated over at least one surface of the lens substrate; an optical material in which a coating layer is laminated over at least one surface of the lens substrate; an optical material in which the film layer and the coating layer are laminated over at least one surface of the lens substrate; an optical material in which the film layer is interposed between two lens substrates; and the like.

The optical material of the present embodiment has the aforementioned characteristics (1) to (3) as a whole, and can be manufactured in the following manner. Herein, the ultraviolet absorber (a) contained in the optical material may include one or more kinds of compounds satisfying the aforementioned conditions. Moreover, known ultraviolet absorbers other than the ultraviolet absorber (a) can be further contained in the lens substrate, the film layer, or the coating layer.

The optical material of the present embodiment can contain a resin obtained from the resin for an optical material (b) or the polymerizable compound (c), and can use the aforementioned transparent resin.

For example, a molded product (a lens substrate or an optical film) can be prepared by using the composition for an optical material containing the ultraviolet absorber (a), and by using the molded product, the optical material can be prepared.

The optical material of the present embodiment can be suitably used as a plastic lens such as a plastic spectacle lens. Hereinafter, the optical material of the present embodiment in the form of a plastic lens will be described.

For example, the plastic lens of the present embodiment is constituted as below.

Plastic lens A: a plastic lens including a lens substrate formed of the composition for an optical material of the present embodiment Plastic lens B: a plastic lens including a film or layer formed of the composition for an optical material of the present embodiment, over at least one surface of a lens substrate (the lens substrate may be obtained from the composition for an optical material of the present embodiment.)

Plastic lens C: a plastic lens in which a lens substrate (the lens substrate may be obtained from the composition for an optical material of the present embodiment) is laminated over both surfaces of a film formed of the composition for an optical material of the present embodiment The plastic lenses constituted as above are designed such that they satisfy the characteristics (1) to (3) of the present invention. The optical material can be suitably used for plastic spectacle lenses.

(Plastic Lens A)

The method for manufacturing the plastic lens A including a lens substrate formed of the composition for an optical material is not particularly limited. However, examples of preferable manufacturing methods thereof include cast polymerization using a mold for casting a lens. The lens substrate can be constituted with polyurethane, polythiourethane, polysulfide, poly(meth)acrylate, or the like, and can be obtained by using the composition for an optical material containing the ultraviolet absorber (a) and the polymerizable compound (c) (a resin monomer for optical material) which is for obtaining the those resins.

Specifically, the composition for an optical material is injected into the cavity of a molding mold held by a gasket, tape, or the like. At this time, depending on the physical properties required to the plastic lens to be obtained, it is preferable to optionally perform a degassing treatment under reduced pressure, a filtration treatment under increased or reduced pressure, and the like in many cases.

After the composition is injected, the mold for casting a lens is heated in a heatable device in an oven or in water according to a predetermined temperature program, such that the composition is cured and molded. If necessary, the resin-molded product may be subjected to a treatment such as annealing.

In the present embodiment, in molding a resin, in addition to the aforementioned "other components", various additives such as a chain extender, a crosslinking agent, an antioxidant, an oil-soluble dye, a filler, and adhesiveness-improving agent can be added according to the purpose, similarly to the known molding methods.

Furthermore, the plastic lens A of the present embodiment may include various coating layers over the lens substrate formed of the composition for an optical material, according to the purpose or use thereof.

As the coating layer, it is possible to use a coating layer which is prepared by using a coating material (composition) containing the ultraviolet absorber (a) or a coating layer which is prepared by using a coating material not containing the ultraviolet absorber (a). Moreover, the plastic lens A can be prepared in a manner in which the coating layer is formed; and then the plastic lens including the coating layer is dipped in a dispersion, which is obtained by dispersing the ultraviolet absorber (a) in water or a solvent, such that the coating layer is impregnated with the ultraviolet absorber (a).

(Plastic Lens B)

The plastic lens B of the present embodiment includes a film or layer formed of the composition for an optical material, over at least one surface of the lens substrate. The lens substrate is formed of the composition for an optical material of the present embodiment. The obtained plastic lens is designed such that it satisfies the characteristics (1) to (3) of the present invention.

Examples of manufacturing methods of the plastic lens B include (1) a method in which a lens substrate is manufactured, and then a film or sheet formed of the composition for an optical material is stuck over at least one surface of the lens substrate; (2) a method in which a film or sheet composed of the composition for an optical material is disposed along the inner wall at one side of the cavity of a molding mold which is held by a gasket or tape as described later, then a polymerizable composition is injected into the cavity, and the composition is cured; and the like.

The film or sheet formed of the composition for an optical material that is used in the method (1) is not particularly limited. However, the film or sheet can be obtained by using pellets of the composition for an optical material obtained by melt kneading, impregnation, or the like, by various methods known in the related art. Specific examples of the various methods known in the related art include molding methods such as an injection molding method, a profile extrusion molding method, a pipe molding method, a tube molding method, a coating molding method for different types of molded products, an injection blow molding method, a direct blow molding method, a T-die sheet or filmmolding method, an inflation filmmolding method, and a press molding method. The obtained film or sheet contains a polycarbonate, a polyolefin, and the like.

The lens substrate can be obtained from known optical resins, and examples of the optical resins include a (thio) urethane, a polysulfide, and the like.

The film or sheet formed of the composition for an optical material can be stuck over the surface of the lens substrate by a known method.

The cast polymerization in the method (2) can be performed in the same manner as the method used for the plastic lens A. Examples of compositions used in the cast polymerization include compositions containing polymerizable compounds (the compositions may contain the ultraviolet absorber (a)).

Furthermore, the plastic lens B of the present embodiment may include various coating layers over the lens substrate or over a "film or layer" formed of the composition for an optical material, according to the purpose or use thereof. Similarly to the plastic lens A, the plastic lens B can contain the ultraviolet absorber (a) in the coating layers.

(Plastic Lens C)

In the plastic lens C of the present embodiment, a lens substrate (the lens substrate may be obtained from the composition for an optical material of the present embodiment) is laminated over both surfaces of a film formed of the composition for an optical material. The obtained plastic lens is designed such that it satisfies the characteristics (1) to (3) of the present invention.

Examples of manufacturing methods of the plastic lens C include (1) a method in which a lens substrate is manufactured, and then the lens substrate is stuck over both surfaces of a film or sheet formed of the composition for an optical material; (2) a method in which a film or sheet formed of the composition for an optical material is disposed in the cavity of a molding mold held by a gasket, tape, or the like in a state of being separated from both of the inner wall of the mold, then a polymerizable composition is injected into the cavity, and the composition is cured; and the like.

As the film or sheet formed of the composition for an optical material and the lens substrate that are used in the method (1), it is possible to use the same film or sheet and the same lens substrate as used in the method (1) used for the plastic lens B. The film or sheet formed of the composition for an optical material can be stuck over the surface of the lens substrate by a known method.

Specifically, the method (2) can be performed as below.

In the space of a mold for casting a lens that is used in the manufacturing method of the plastic lens A, the film or sheet formed of the composition for an optical material is disposed, such that both surfaces of the film or sheet becomes parallel to the inner surface of the mold at the front side facing the film or sheet.

Thereafter, in the space of the mold for casting a lens, the composition containing the polymerizable compound (the composition may contain the ultraviolet absorber (a)) is injected into two spaces portions between the mold and a polarizing film by a predetermined injection device.

Subsequently, after the composition is injected, the mold for casting a lens is heated in a heatable device in an oven or in water according to a predetermined temperature program, such that the composition is cured and molded. If necessary, the resin-molded product may be subjected to a treatment such as annealing.

Furthermore, the plastic lens C of the present embodiment may include various coating layers over the lens substrate, according to the purpose or use thereof. Similarly to the plastic lens A, the plastic lens C can contain the ultraviolet absorber (a) in the coating layers.

In the present embodiment, from the viewpoint of manufacturing an optical material, which has a light transmittance satisfying the aforementioned characteristics (1) to (3) when being in the form of an optical material having a thickness of 2 mm, with excellent controllability, it is preferable to use a lens substrate obtained from the composition for an optical material of the present embodiment.

[Plastic Spectacle Lens]

A plastic spectacle lens can be obtained by using the plastic lens of the present embodiment. Herein, a coating layer may be optionally provided over either or both of the surfaces of the lens.

Specific examples of the coating layer include a primer layer, a hard coat layer, an antireflection layer, an antifogging coat layer, an antifouling layer, a water repellent layer, and the like. These coating layers may be used singly, or a plurality of coating layers may be used in the form of a multilayer. When the coating layer is provided over both surfaces of the lens, each of the surfaces may be provided with the same coating layer or with different coating layers.

For each of the coating layers, known ultraviolet absorbers other than the ultraviolet absorber (a), an infrared absorber for protecting the eye from infrared rays, a light stabilizer or an antioxidant for improving weather resistance of the lens, a dye or a pigment for making the lens more fashionable, a photochromic dye or a photochromic pigment, an antistatic agent, and other known additives for improving performance of the lens can be concurrently used. For a layer subjected to coating, various leveling agents for improving coating properties may be used.

Generally, the primer layer is formed between the hard coat layer, which will be described later, and the lens. The primer layer is a coating layer for improving adhesiveness between the lens and the hard coat layer which is formed over the primer layer, and can also improve impact resistance in some cases. For the primer layer, any material can be used as long as it exhibits a high degree of adhesiveness with respect to the obtained lens. However, generally, a urethane-based resin, an epoxy-based resin, a polyester-based resin, a melamine-based resin, a primer composition containing polyvinyl acetal as a main component, or the like is used. For the primer composition, an appropriate solvent not exerting an influence on the lens may be used so as to adjust viscosity of the composition. Needless to say, the composition not containing a solvent may be used.

The primer layer can be formed by any method including a coating method and a dry method. When the coating method is used, the lens is coated with the primer composition by a known coating method such as spin coating or dip coating, and then the composition is solidified to form a primer layer. When the dry method is used, the primer layer is formed by a known dry method such as a CVD method or a vacuum deposition method. In forming the primer layer, in order to improve adhesiveness, the surface of lens may be optionally subjected to a pre-treatment such as an alkali treatment, a plasma treatment, or an ultraviolet treatment.

The hard coat layer is a coating layer for providing functions, such as scratch resistance, abrasion resistance, moisture resistance, resistance to hot water, heat resistance, and weather resistance, to the lens surface.

Generally, for the hard coat layer, a hard coat composition is used which contains a curable organic silicon compound and one or more kinds of fine particles of an oxide of an element selected from the group of elements including Si, Al, Sn, Sb, Ta, Ce, La, Fe, Zn, W, Zr, In, and Ti and/or one or more kinds of fine particles constituted with a composite oxide of two or more elements selected from the group of elements.

The hard coat composition preferably contains at least one of amines, amino acids, metal acetyl acetonate complexes, organic acid metal salts, perchloric acids, salts of perchloric acids, acids, metal chlorides, and polyfunctional epoxy compounds, in addition to the aforementioned components. For the hard coat composition, an appropriate solvent that does not exert an influence on the lens may be used, and the composition not containing a solvent may be used.

Generally, the lens is coated with the hard coat composition by a known coating method such as spin coating or dip coating, and then the composition is cured, whereby the hard coat layer is formed. Examples of curing methods include thermal curing, curing methods performed by irradiation of energy rays such as ultraviolet rays or visible rays, and the like. In order to inhibit formation of interference fringes, a difference between the refractive index of the hard coat layer and the refractive index of the lens is preferably within a range of ±0.1.

Generally, the antireflection layer is optionally formed over the hard coat layer. The antireflection layer is classified into an inorganic antireflection layer and an organic antireflection layer. The inorganic antireflection layer is formed of an inorganic oxide such as $SiO_2$ or $TiO_2$ by a dry method such as a vacuum deposition method, a sputtering method, an ion plating method, an ion beam-assisted method, and a CVD method. The organic antireflection layer is formed of a composition, which contains an organic silicon compound and fine silica-based particles having internal cavities, by a wet method.

The antireflection layer is composed of a single layer or multiple layers. When it is used in the form of a single layer, a value obtained by subtracting the refractive index of the antireflection layer from the refractive index of the hard coat layer is preferably at least equal to or greater than 0.1. In order to cause the antireflection layer to effectively perform an antireflection function, it is preferable to constitute the antireflection film with multiple films, and in this case, a film with a low refractive index and a film with a high refractive index are alternately laminated on each other. Even in this case, a difference in refractive index between the film with a low refractive index and the film with a high refractive index is preferably equal to or greater than 0.1. Examples of the film with a high refractive index include films of ZnO, $TiO_2$, $CeO_2$, $Sb_2O_5$, $SnO_2$, $ZrO_2$, $Ta_2O_5$, and the like, and examples of the film with a low refractive index include films of $SiO_2$ and the like.

If necessary, an antifogging layer, an antifouling layer, or a water repellent layer may be formed over the antireflection film layer. Regarding the method for forming the antifogging layer, the antifouling layer, and the water repellent layer, the method, material, and the like used for treating these layers are not particularly limited as long as they do not exert a negative influence on the antireflection function. It is possible to use known methods and materials used for an antifogging treatment, an antifouling treatment, and a water repellency treatment. Examples of the methods used for the antifogging treatment and the antifouling treatment include a method of covering the surface with a surfactant; a method of giving water absorbing properties to the layer by adding a hydrophilic film to the surface of the layer; a method of improving the water absorbing properties by forming fine concavities and convexities over the surface of the layer; a method of giving water absorbing properties to the layer by utilizing photocatalytic activity; a method performing a super water repellency treatment over the layer to prevent water drops from adhering to the layer; and the like. Examples of the methods used for the water repellency treatment include a method of forming a layer having undergone the water repellency treatment comprised of a fluorine-containing silane compound or the like by vapor deposition or sputtering; a method of dissolving a fluorine-containing silane compound in a solvent and then coating a layer with the solution so as to form a layer having undergone the water repellency treatment; and the like.

Second Embodiment

In the present embodiment, an optical material can be prepared by using a composition for an optical material not containing the ultraviolet absorber (a). Herein, the composition for an optical material can contain the same components as described in the first embodiment except for the ultraviolet absorber (a), and can be constituted in the same manner as in the first embodiment. The present embodiment will be described below. In the following description, description of the points common to the first and the second embodiments will not be repeated.

The optical material of the present embodiment can be suitably used as a plastic spectacle lens, and includes a lens substrate, and a film layer and a coating layer that are optionally laminated over the lens substrate.

The manufacturing method of the plastic spectacle lens of the present embodiment can include the following steps.

Step a: preparing a lens substrate containing a resin (a resin for an optical material or a resin obtained from a polymerizable compound)

Step b: impregnating the obtained lens substrate with ultraviolet absorber (a)

The composition for an optical material used in Step a is the same as the composition for an optical material described in the first embodiment, except that the composition does not contain the ultraviolet absorber (a). In Step a, a lens substrate (molded product) can be obtained in the same manner as in the first embodiment.

In Step b, the obtained lens substrate is dipped in a dispersion, which is obtained by dispersing the ultraviolet absorber (a) in water or in a solvent, such that the lens substrate is impregnated with the ultraviolet absorbers, and then the lens substrate is dried.

The amount of the ultraviolet absorber (a) used for impregnation can be controlled to be an intended amount according to the concentration of the ultraviolet absorbers in the dispersion, the temperature of the dispersion, and time taken for dipping the lens substrate. The higher the concentration and the temperature, and the longer the dipping time, the larger the amount of the ultraviolet absorbers used for impregnation. When it is required to accurately control the amount of the ultraviolet absorbers used for impregnation, under a condition in which amount of the ultraviolet absorbers used for impregnation set to be small, the lens substrate is repeatedly dipped in the dispersion plural times.

In the present embodiment, the manufacturing method can further include a step of forming a coating layer over at least one surface of the lens substrate impregnated with the ultraviolet absorber (a). Specifically, by using a coating material (a composition for an optical material) containing the ultraviolet absorber (a), a coating layer containing the ultraviolet absorber (a) can be formed over an optical material such as a plastic lens.

Moreover, the manufacturing method can include a step of laminating the lens substrate impregnated with the ultraviolet absorber (a) over at least one surface of a film, preferably, over both surfaces of a film.

In the second embodiment, the optical material obtained by the manufacturing method includes the lens substrate, and the film layer and the coating layer that are optionally laminated over the lens substrate.

Up to now, the present invention has been described by using embodiments. However, the present invention is not limited to the embodiments, and various embodiments can be adopted as long as the effects of the invention of the present application are not diminished.

EXAMPLE

Hereinafter, the present invention will be more specifically described by using examples, but the present invention is not limited to the examples. The materials and evaluation methods used in the examples of the present invention are as follows.

[Method for Measuring Light Transmittance]

By using a Shimadzu Spectrophotometer UV-1600 manufactured by Shimadzu Corporation as a measurement instrument and using a Plano lens having a thickness of 2 mm, an ultraviolet-visible light spectrum was measured.

[Method for Measuring Y.I Value]

Y.I value was measured by using a flat plate having a thickness of 2 mm and a chromameter CR-200 manufactured by Konica Minolta, Inc.

[Measurement of Refractive Index and Abbe Number]

Refractive index and Abbe number were measured at 20° C. by using a Pulfrich refractometer KPR-30 manufactured by Shimadzu Corporation.

[Measurement of Glass Transition Temperature (Tg)]

A glass transition temperature was measured by a TMA penetration method (load: 50 g; pin tip: 0.5 mmφ, rate of temperature increase: 10° C./min) by using a thermomechanical analyzer TMA-60 manufactured by Shimadzu Corporation.

[Evaluation of External Appearance of Sample Lens]

The transparency and external appearance of sample lenses prepared in examples and comparative examples were checked by visual observation.

The external appearance was evaluated based on the following criteria.

AA: colorless
A: slightly yellow
C: yellow or white

[Evaluation of Eye Fatigue in the Case of Wearing Sample Lenses]

Test participants were asked to wear sample lenses prepared in examples and comparative examples and operate a PC equipped with a liquid crystal display for 5 hours straight. On the next day, the participants were asked to operate the PC for 5 hours straight without wearing the sample lens (with the naked eye). Five participants named A to E performed evaluation.

A: Unlike the case in which the participant operated the PC with the naked eye, the participant did not feel eye fatigue when he or she wore the sample lens.

B: The participant did not feel change in eye fatigue even when he or she wore the sample lens after operating the PC with the naked eye.

C: Unlike the case in which the participant operated the PC with the naked eye, the participant felt eye fatigue when he or she wore the sample lens.

Example 1

0.025 g of dibutyl tin (II) dichloride, 0.07 g of ZelecUN manufactured by Stepan Company, 0.28 g of 2-(2-hydroxy-3-t-butyl-5-methylphenyl)-chlorobenzotriazole manufactured by BASF Corporation, and 35.4 g of a mixture of 2,5-bis(isocyanatomethyl)-bicyclo[2,2,1]heptane and 2,6-bis(isocyanatomethyl)-bicyclo[2,2,1]heptane were put into a thoroughly dried flask, thereby preparing a mixed liquid. The mixed liquid was thoroughly dissolved by being stirred at 25° C. for 1 hour. Thereafter, 16.7 g of pentaerythritol tetrakis(3-mercaptopropionate) and 17.9 g of 1,2-bis[(2-mercaptoethyl)thio]-3-mercaptopropane were added to the mixed liquid, and the resultant was stirred at 25° C. for 30 minutes, thereby preparing a liquid preparation. Herein, the amount of 2-(2-hydroxy-3-t-butyl-5-methylphenyl)-chlorobenzotriazole contained in the liquid preparation was 0.4% by weight with respect to the total weight of the polymerizable compound.

The liquid preparation was degassed for 1 hour at 600 Pa, and filtered through a 1 μm PTFE filter. Then the resultant was injected into a glass mold for 2C plano having a central thickness of 2 mm and a diameter of 80 mm and a glass mold for a flat plate having a central thickness of 2 mm and a diameter of 78 mm. The glass mold was gradually heated from 25° C. up to 120° C. over 16 hours, and held at 120° C. for 4 hours. After the glass mold was cooled to room temperature, the product was taken out of the glass mold, thereby obtaining a plano lens. The obtained plano lens was annealed at 120° C. for 2 hours. The ultraviolet-visible light spectrum of the lens was measured by using a spectrophotometer UV-1600 (manufactured by Shimadzu Corporation). The chart showing the result is shown in FIG. 1. The obtained lens had a refractive index of 1.597, an Abbe number of 40, and Tg of 114° C.

The lens was scraped off into an appropriate shape by using an edging machine manufactured by NIDEK CO., LTD. and fixed in a spectacle frame, thereby obtaining sample spectacles.

Example 2

A plano lens was prepared in the same manner as in Example 1, except that 2-(2-hydroxy-3-t-butyl-5-methylphenyl)-chlorobenzotriazole in Example 1 was added in an amount of 0.7 g (1.0% by weight with respect to the total weight of the polymerizable compound), and a sample spectacle was prepared in the same manner as in Example 1. The obtained lens had a refractive index of 1.597, an Abbe number of 40, and Tg of 114° C.

Example 3

A plano lens was prepared in the same manner as in Example 1, except that 2-(2-hydroxy-3-t-butyl-5-methylphenyl)-chlorobenzotriazole in Example 1 was added in an amount of 1.05 g (1.5% by weight with respect to the total weight of the polymerizable compound), and a sample spectacle was prepared in the same manner as in Example 1. The ultraviolet-visible light spectrum of the lens was measured by using a spectrophotometer UV-1600 (manufactured by Shimadzu Corporation). The chart showing the result is shown in FIG. 1.

Example 4

0.007 g of dibutyl tin (II) dichloride, 0.07 g of ZelecUN manufactured by Stepan Company, 0.28 g of 2-(2-hydroxy-3-t-butyl-5-methylphenyl)-chlorobenzotriazole manufactured by BASF Corporation, and 35.5 g of m-xylylene diisocyanate were put into a thoroughly dried flask, thereby preparing a mixed liquid. The mixed liquid was thoroughly dissolved by being stirred at 25° C. for 1 hour. Thereafter, 34.5 g of a mixture which contained, as main components, 5,7-dimercaptomethyl-1,11-dimercapto-3,6,9-trithiaundecane, 4,7-dimercaptomethyl-1,11-dimercapto-3,6,9-trithiaundecane, and 4,8-dimercaptomethyl-1,11-dimercapto-3,6,9-trithiaundecane was added to the mixed liquid, the resultant was stirred at 25° C. for 30 minutes, thereby preparing a liquid preparation. Herein, the amount of 2-(2-hydroxy-3-t-butyl-5-methylphenyl)-chlorobenzotriazole contained in the liquid preparation was 0.4% by weight with respect to the total weight of the polymerizable compound. A plano lens was prepared in the same manner as in Example 1, except that the liquid preparation was prepared in the aforementioned manner, and a sample spectacle was prepared in the same manner as in Example 1. The obtained lens had a refractive index of 1.667, an Abbe number of 31, and Tg of 100° C.

Example 5

0.021 g of dibutyl tin (II) dichloride, 0.084 g of ZelecUN manufactured by Stepan Company, 0.28 g of 2-(2-hydroxy-3-t-butyl-5-methylphenyl)-chlorobenzotriazole manufactured by BASF Corporation, and 34.8 g of a mixture of 2,5-bis(isocyanatomethyl)-bicyclo[2,2,1]heptane and 2,6-bis(isocyanatomethyl)-bicyclo[2,2,1]heptane were put into a thoroughly dried flask, thereby preparing a mixed liquid. The mixed liquid was thoroughly dissolved by being stirred at 25° C. for 1 hour. Thereafter, 17.1 g of pentaerythritol tetrakis(3-mercaptopropionate) and 18.1 g of a mixture which contained, as main components, 5,7-dimercaptomethyl-1,11-dimercapto-3,6,9-trithiaundecane, 4,7-dimercaptomethyl-1,11-dimercapto-3,6,9-trithiaundecane, and 4,8-dimercaptomethyl-1,11-dimercapto-3,6,9-trithiaundecane were added to the liquid preparation, and the resultant was stirred at 25° C. for 30 minutes, thereby preparing a liquid preparation. Herein, the amount of 2-(2-hydroxy-3-t-butyl-5-methylphenyl)-chlorobenzotriazole contained in the liquid preparation was 0.4% by weight with respect to the total weight of the polymerizable compound. A plano lens was prepared in the same manner as in Example 1, except that the liquid preparation was prepared in the aforementioned manner, and a sample spectacle was prepared in the same manner as in Example 1. The obtained lens had a refractive index of 1.599, an Abbe number of 40, and Tg of 123° C.

Example 6

0.119 g of dibutyl tin (II) dichloride, 0.046 g of ZelecUN manufactured by Stepan Company, 0.42 g of 2-(2-hydroxy-3-t-butyl-5-methylphenyl)-chlorobenzotriazole manufactured by BASF Corporation, 10.9 g of isophorone diisocyanate, and 19.2 g of hexamethylene diisocyanate were put into a thoroughly dried flask, thereby preparing a mixed liquid. The mixed liquid was thoroughly dissolved by being stirred at 25° C. for 1 hour. Thereafter, 39.9 g of pentaerythritol tetrakis(3-mercaptopropionate) was added to the liquid preparation, and the resultant was stirred at 25° C. for 30 minutes, thereby preparing a liquid preparation. Herein, the amount of 2-(2-hydroxy-3-t-butyl-5-methylphenyl)-chlorobenzotriazole contained in the liquid preparation was 0.6% by weight with respect to the total weight of the polymerizable compound. A plano lens was prepared in the same manner as in Example 1, except that the liquid preparation was prepared in the aforementioned manner, and a sample spectacle was prepared in the same manner as in Example 1.

Example 7

0.40 g of TINUVIN292 manufactured by BASF Corporation, 0.52 g of ZelecUN manufactured by Stepan Company, 0.40 g of 2-(2-hydroxy-3-t-butyl-5-methylphenyl)-chlorobenzotriazole manufactured by BASF Corporation, and 47.14 g of tolylene diisocyanate were put into a thoroughly dried flask, thereby preparing a mixed liquid. The mixed liquid was thoroughly dissolved by being stirred at 25° C. for 1 hour. Thereafter, 7.93 g of trimethylolpropane propoxylate was added to the liquid preparation, and the resultant was subjected to prepolymerization at 25° C. for 3 hours. The prepolymer solution was degassed for 1 hour at 600 Pa and filtered through a 1 μm PTFE filter. Likewise, 44.93 g of trimethylolpropane propoxylate was degassed for 1 hour at 600 Pa and filtered through a 1 μm PTFE filter. These two liquids were mixed and stirred together at 15° C. to 20° C. and injected into a glass mold for 2C plano having a central thickness of 2 mm and a diameter of 80 mm. Herein, the amount of 2-(2-hydroxy-3-t-butyl-5-methylphenyl)-chlorobenzotriazole contained in the liquid preparation was 0.4% by weight with respect to the total weight of the polymerizable compound.

The glass mold was gradually heated from 30° C. up to 130° C. over 7 hours 30 minutes, and held at 130° C. for 2 hours. A plano lens was obtained in the same manner as in Example 1, except that the glass mold was cooled to room temperature, the product was taken out of the glass mold, and a sample spectacle was prepared in the same manner as in Example 1.

Example 8

0.28 g of 2-(2-hydroxy-3-t-butyl-5-methylphenyl)-chlorobenzotriazole manufactured by BASF Corporation, and 63.6 g bis(2,3-epithiopropyl)disulfide were put into a thoroughly dried flask, and the resultant was stirred at 20° C. for 1 hour, thereby preparing a solution. To this solution, a solution obtained by dissolving 0.013 g of N,N-dimethylcyclohexylamine and 0.064 g of N,N-dicyclohexylmethylamine in 6.4 g of a mixture which contained, as main components, 5,7-dimercaptomethyl-1,11-dimercapto-3,6,9-trithiaundecane, 4,7-dimercaptomethyl-1,11-dimercapto-3,6,9-trithiaundecane, and 4,8-dimercaptomethyl-1,11-dimercapto-3,6,9-trithiaundecane was added, and the resultant was stirred at 20° C. for 30 minutes, thereby preparing a liquid preparation. Herein, the amount of 2-(2-hydroxy-3-t-butyl-5-methylphenyl)-chlorobenzotriazole contained in the liquid preparation was 0.4% by weight with respect to the total weight of the polymerizable compound.

The liquid preparation was degassed for 1 hour at 600 Pa, and filtered through a 1 μm PTFE filter. Then the resultant was injected into a glass mold for 2C plano having a central thickness of 2 mm and a diameter of 80 mm.

The glass mold was gradually heated from 30° C. up to 80° C. over 19 hours, and held at 80° C. for 2 hours. After the glass mold was cooled to room temperature, the product was taken out of the glass mold, thereby obtaining a plano lens. The obtained plano lens was annealed at 120° C. for 3 hours. The lens was scraped off into an appropriate shape by using an edging machine manufactured by NIDEK CO., LTD. and fixed in a spectacle frame, thereby obtaining sample spectacles.

Example 9

A plano lens was prepared in the same manner as in Example 1, except that 2-(2-hydroxy-3-t-butyl-5-methylphenyl)-chlorobenzotriazole in Example 1 was added in an amount of 0.21 g (0.3% by weight with respect to the total weight of the polymerizable compound), and a sample spectacle was prepared in the same manner as in Example 1.

Example 10

0.1 g of ZelecUN manufactured by Stepan Company, 1.1 g of 2-(2-hydroxy-3-t-butyl-5-methylphenyl)-chlorobenzotriazole manufactured by BASF Corporation, and 57.4 g of dicyclohexyl methane-4,4'-diisocyanate were put into a thoroughly dried flask, thereby preparing a mixed liquid. The mixed liquid was thoroughly dissolved by being stirred at 20° C. for 2 hours. To this mixed liquid, 1.0 g of a master liquid, which was obtained by mixing 50.0 g of dicyclohexyl methane-4,4'-diisocyanate with 0.005 g of PlastBlue8514 manufactured by ARIMOTO CHEMICAL CO., LTD., and 0.5 g of a master liquid, which was obtained by mixing 50.0 g of dicyclohexyl methane-4,4'-diisocyanate with 0.005 g of PlastRed8320 manufactured by ARIMOTO CHEMICAL CO., LTD., were added, thereby preparing a mixed liquid. To this mixed liquid, 41.1 g of a mixture which contained, as main components, 5,7-dimercaptomethyl-1,11-dimercapto-3,6,9-trithiaundecane, 4,7-dimercaptomethyl-1,11-dimercapto-3,6,9-trithiaundecane, and 4,8-dimercaptomethyl-1,11-dimercapto-3,6,9-trithiaundecane and 0.15 g of dibutyl tin (II) dichloride were added, and the resultant was stirred at 20° C. for 30 minutes, thereby preparing a liquid preparation. Herein, the amount of 2-(2-hydroxy-3-t-butyl-5-methylphenyl)-chlorobenzotriazole contained in the liquid preparation was 1.1% by weight with respect to the total weight of the polymerizable compound. A plano lens was prepared in the same manner as in Example 1, except that the liquid preparation was prepared in the aforementioned manner, and a sample spectacle was prepared in the same manner as in Example 1. The obtained lens had a refractive index of 1.602, an Abbe number of 40, and Tg of 120° C.

Example 11

0.15 g of dimethyl tin (II) dichloride, 0.1 g of ZelecUN manufactured by Stepan Company, 0.8 g of 2-(2-hydroxy-3-t-butyl-5-methylphenyl)-chlorobenzotriazole manufactured by BASF Corporation, 43.1 g of isophorone diisocyanate, and 8.9 g of hexamethylene diisocyanate were put into a thoroughly dried flask, thereby preparing a mixed liquid. The mixed liquid was thoroughly dissolved by being stirred at 20° C. for 2 hours. To this mixed liquid, 1.0 g of a master liquid, which was obtained by mixing 50.0 g of isophorone diisocyanate with 0.005 g of PlastBlue8514 manufactured by ARIMOTO CHEMICAL CO., LTD., and 0.5 g of a master liquid, which was obtained by mixing 50.0 g of isophorone diisocyanate with 0.005 g of PlastRed8320 manufactured by ARIMOTO CHEMICAL CO., LTD., were added, thereby preparing a mixed liquid. To this mixed liquid, 46.5 g of a mixture which contained, as main components, 5,7-dimercaptomethyl-1,11-dimercapto-3,6,9-trithiaundecane, 4,7-dimercaptomethyl-1,11-dimercapto-3,6,9-trithiaundecane, and 4,8-dimercaptomethyl-1,11-dimercapto-3,6,9-trithiaundecane was added, and the resultant was stirred at 20° C. for 30 minutes, thereby preparing a liquid preparation. Herein, the amount of 2-(2-hydroxy-3-t-butyl-5-methylphenyl)-chlorobenzotriazole contained in the liquid preparation was 0.8% by weight with respect to the total weight of the polymerizable compound. A plano lens was prepared in the same manner as in Example 1, except that the liquid preparation was prepared in the aforementioned manner, and a sample spectacle was prepared in the same manner as in Example 1. The obtained lens had a refractive index of 1.603, an Abbe number of 38, and Tg of 127° C.

Example 12

0.025 g of dibutyl tin (II) dichloride, 0.07 g of ZelecUN manufactured by Stepan Company, 0.28 g of 2-(2-hydroxy-3-t-butyl-5-methylphenyl)-chlorobenzotriazole manufactured by BASF Corporation, and 35.4 g of a mixture of 2,5-bis(isocyanatomethyl)-bicyclo[2,2,1]heptane and 2,6-bis(isocyanatomethyl)-bicyclo[2,2,1]heptane were put into a thoroughly dried flask, thereby preparing a mixed liquid. The mixed liquid was thoroughly dissolved by being stirred at 25° C. for 1 hour. Thereafter, to this mixed liquid, 1.4 g of master liquid obtained by mixing 50.0 g of a mixture of 2,5-bis(isocyanatomethyl)-bicyclo[2,2,1]heptane and 2,6-bis(isocyanatomethyl)-bicyclo[2,2,1]heptane with 0.005 g of PlastBlue8514 manufactured by ARIMOTO CHEMICAL CO., LTD. was added, thereby preparing a mixed liquid. Subsequently, 16.7 g of pentaerythritol tetrakis(3-mercaptopropionate) and 17.9 g of 1,2-bis[(2-mercaptoethyl)thio]-3-mercaptopropane were added to the mixed liquid, and the resultant was stirred at 25° C. for 30 minutes, thereby preparing a liquid preparation. Herein, the amount of 2-(2-hydroxy-3-t-butyl-5-methylphenyl)-chlorobenzotriazole contained in the liquid preparation was 0.4% by weight with respect to the total weight of the polymerizable compound.

The liquid preparation was degassed for 1 hour at 600 Pa, and filtered through a 1 μm PTFE filter. Then the resultant was injected into a glass mold for 2C plano having a central thickness of 2 mm and a diameter of 80 mm and a glass mold for a flat plate having a central thickness of 2 mm and a diameter of 78 mm. The glass mold was gradually heated from 25° C. up to 120° C. over 16 hours, and held at 120° C. for 4 hours. After the glass mold was cooled to room temperature, the product was taken out of the glass mold, thereby obtaining a plano lens. The obtained plano lens was annealed at 120° C. for 2 hours. The lens was scraped off into an appropriate shape by using an edging machine manufactured by NIDEK CO., LTD. and fixed in a spectacle frame, thereby obtaining sample spectacles.

Comparative Example 1

2-(2-hydroxy-3-t-butyl-5-methylphenyl)-chlorobenzotriazole in Example 1 was added in an amount of 1.75 g (2.5% by weight with respect to the total weight of the polymerizable compound), but it was not completely dissolved in 2,5(6)-bis(isocyanatomethyl)-bicyclo[2,2,1]heptane. Accordingly, a lens was not prepared.

Comparative Example 2

A plano lens was prepared in the same manner as in Example 1, except that instead of 2-(2-hydroxy-3-t-butyl-5-methylphenyl)-chlorobenzotriazole in Example 1,2-(2'-hydroxy-5'-t-octylpheyl)benzotriazole was added in an amount of 1.05 g (1.5% by weight with respect to the total weight of the polymerizable compound), and a sample spectacle was prepared in the same manner as in Example 1. The ultraviolet-visible light spectrum of the lens was measured by using a spectrophotometer UV-1600 (manufactured by Shimadzu Corporation). The chart showing the result is shown in FIG. 1.

Comparative Example 3

A plano lens was prepared in the same manner as in Example 1, except that instead of 2-(2-hydroxy-3-t-butyl-5-methylphenyl)-chlorobenzotriazole in Example 1,2-(2'-hydroxy-5'-t-octylphenyl)benzotriazole was added in an amount of 7.0 g (10.0% by weight with respect to the total weight of the polymerizable compound), and a sample spectacle was prepared in the same manner as in Example 1. As a result, the sample spectacle was cloudy.

Comparative Example 4

A plano lens was prepared in the same manner as in Example 1, except that instead of 2-(2-hydroxy-3-t-butyl-5-methylphenyl)-chlorobenzotriazole in Example 1, TINUVIN Carboprotect manufactured by BASF Corporation was added in an amount of 0.021 g (0.03% by weight with respect to the total weight of the polymerizable compound), and a sample spectacle was prepared in the same manner as in Example 1.

Comparative Example 5

A plano lens was prepared in the same manner as in Example 1, except that instead of 2-(2-hydroxy-3-t-butyl-5-methylphenyl)-chlorobenzotriazole in Example 1,2-(3,5-di-t-amyl-2-hydroxyphenyl)-benzotriazole was added in an amount of 1.05 g (1.5% by weight with respect to the total weight of the polymerizable compound), and a sample spectacle was prepared in the same manner as in Example 1.

Comparative Example 6

0.011 g of dibutyl tin (II) dichloride, 0.07 g of ZelecUN manufactured by Stepan Company, 1.4 g of 2-(3,5-di-t-amyl-2-hydroxyphenyl)-benzotriazole, and 36.4 g of m-xylylene diisocyanate were put into a thoroughly dried flask, thereby preparing a mixed liquid. The mixed liquid was thoroughly dissolved by being stirred at 25° C. for 1 hour. 33.6 g of 1,2-bis[(2-mercaptoethyl)thio]-3-mercaptopropane was added to the mixed liquid, and the resultant was stirred at 25° C. for 30 minutes, thereby preparing a liquid preparation. Herein, the amount of 2-(3,5-di-t-amyl-2-hydroxyphenyl)-benzotriazole contained in the liquid preparation was 2.0% by weight with respect to the total, weight of the polymerizable compound. A plano lens was prepared in the same manner as in Example 1, except that the liquid preparation was prepared in the aforementioned manner, and a sample spectacle was prepared in the same manner as in Example 1. As a result, the sample spectacle was cloudy.

Comparative Example 7

A plano lens was prepared in the same manner as in Comparative example 6, except that 2-(3,5-di-t-amyl-2-hydroxyphenyl)-benzotriazole in Comparative example 6 was added in an amount of 0.42 g (0.6% by weight with respect to the total weight of the polymerizable compound), and a sample spectacle was prepared in the same manner as in Example 1.

Figure 2:
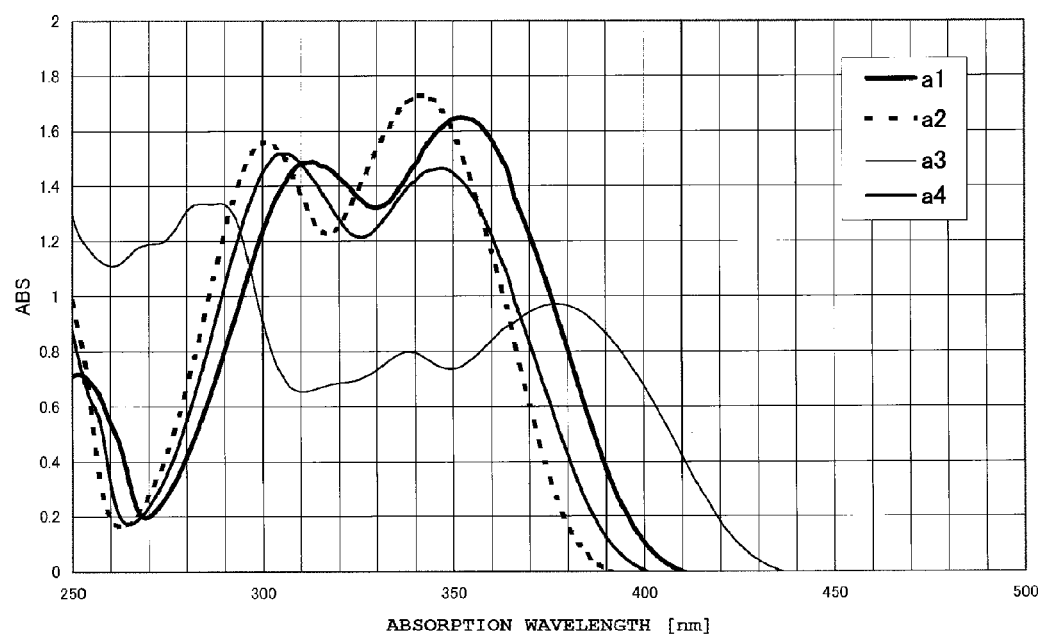
FIG. 2 is a chart showing ultraviolet-visible light spectra of ultraviolet absorbers, which are used in examples and comparative examples, in a chloroform solution.

FIG. 2 is a chart showing ultraviolet-visible light spectra of ultraviolet absorbers, which are used in examples and comparative examples, in a chloroform solution. Ultraviolet absorbers a1 to a4 shown in FIG. 2 will be described later.

Table 1 shows the light transmittance of sample spectacles of examples and comparative examples at a specific wavelength (410 nm, 420 nm, or 440 nm), and shows the evaluation results of external appearance. Furthermore, Table 2 shows the evaluation results of eye fatigue.

TABLE 1

| | Composition for optical material | | | | Optical material | | | | | |
|---|---|---|---|---|---|---|---|---|---|---|
| | Ultraviolet absorber (a) | Resin monomer (c) | (a)/(c) × 100 (% by weight) | Bluing agent | 410 nm Transmittance (%) | 420 nm Transmittance (%) | 440 nm Transmittance (%) | transparency | Coloring | Y.I Note |
| Example 1 | a1 | c1, c2, c3 | 0.4 | — | 3.3 | 46.7 | 88.5 | Transparent | AA | 8.8 |
| Example 2 | a1 | c1, c2, c3 | 1.0 | — | 0.1 | 15.5 | 85.2 | Transparent | AA | — |
| Example 3 | a1 | c1, c2, c3 | 1.5 | — | 0.1 | 12.3 | 84.5 | Transparent | A | — |
| Example 4 | a1 | c4, c5 | 0.4 | — | 0.7 | 28.1 | 84.6 | Transparent | AA | — |
| Example 5 | a1 | c1, c2, c5 | 0.4 | — | 2.8 | 43.7 | 87.6 | Transparent | AA | — |
| Example 6 | a1 | c2, c6, c7 | 0.6 | — | 1.7 | 41.7 | 88.5 | Transparent | A | — |
| Example 7 | a1 | c8, c9 | 0.4 | — | 0.6 | 31.4 | 87.4 | Transparent | AA | — |
| Example 8 | a1 | c5, c10 | 0.4 | — | 0.1 | 12.3 | 80.1 | Transparent | AA | — |
| Example 9 | a1 | c1, c2, c3 | 0.3 | — | 6.6 | 52.9 | 88.2 | Transparent | AA | — |

TABLE 1-continued

| | Composition for optical material | | | | Optical material | | | | | | |
|---|---|---|---|---|---|---|---|---|---|---|---|
| | Ultraviolet absorber (a) | Resin monomer (c) | (a)/(c) × 100 (% by weight) | Bluing agent | 410 nm Transmittance (%) | 420 nm Transmittance (%) | 440 nm Transmittance (%) | transparency | Coloring | Y.I | Note |
| Example 10 | a1 | c5, c11 | 1.1 | d1, d2 | 0.1 | 14.7 | 84.9 | Transparent | AA | — | |
| Example 11 | a1 | c5, c6, c7 | 0.8 | d1, d2 | 0.2 | 21.7 | 85.8 | Transparent | AA | — | |
| Example 12 | a1 | c1, c2, c3 | 0.4 | d1 | 2.9 | 43.9 | 87.0 | Transparent | AA | 3.4 | |
| Comparative example 1 | a1 | c1, c2, c3 | 2.5 | — | — | — | — | — | — | — | Not completely dissolved in monomer liquid |
| Comparative example 2 | a2 | c1, c2, c3 | 1.5 | — | 61.8 | 84.8 | 89.1 | Transparent | AA | — | |
| Comparative example 3 | a2 | c1, c2, c3 | 10.0 | — | 0.4 | 1.4 | 2.4 | White turbidity | C | — | Cloudy |
| Comparative example 4 | a3 | c1, c2, c3 | 0.03 | — | 10.2 | 28.2 | 77.9 | Transparent | C | — | |
| Comparative example 5 | a4 | c1, c2, c3 | 1.5 | — | 13.7 | 66.4 | 89.3 | Transparent | AA | — | |
| Comparative example 6 | a4 | c3, c4 | 2.0 | — | — | — | — | White turbidity | C | — | White turbidity |
| Comparative example 7 | a4 | c3, c4 | 0.6 | — | 23.3 | 69.9 | 87.2 | Transparent | AA | — | |

The ultraviolet absorber (a), the polymerizable compound (c), and the bluing agent shown in Table 1 are as follows.

a1: 2-(2-hydroxy-3-t-butyl-5-methylphenyl)-chlorobenzotriazole
a2: 2-(2'-hydroxy-5'-t-octylphenyl)benzotriazole
a3: TINUVIN Carboprotect
a4: 2-(3,5-di-t-amyl-2-hydroxyphenyl)-benzotriazole
c1: mixture of 2,5-bis(isocyanatomethyl)-bicyclo[2,2,1]heptane and 2,6-bis(isocyanatomethyl)-bicyclo[2,2,1]heptane
c2: pentaerythritol tetrakis(3-mercaptopropionate)
c3: 1,2-bis[(2-mercaptoethyl)thio]-3-mercaptopropane
c4: m-xylylene diisocyanate
c5: mixture containing 5,7-dimercaptomethyl-1,11-dimercapto-3,6,9-trithiaundecane, 4,7-dimercaptomethyl-1,11-dimercapto-3,6,9-trithiaundecane, and 4,8-dimercaptomethyl-1,11-dimercapto-3,6,9-trithiaundecane as main components
c6: isophorone diisocyanate
c7: hexamethylene diisocyanate
c8: tolylene diisocyanate
c9: trimethylolpropane propoxylate
c10: bis(2,3-epithiopropyl)disulfide
c11: dicyclohexylmethane-4,4'-diisocyanate
d1: PlastBlue8514
d2: PlastRed8320

TABLE 2

| | Evaluator | | | | |
|---|---|---|---|---|---|
| | A | B | C | D | E |
| Example 1 | A | A | B | A | A |
| Example 2 | A | A | A | A | A |
| Example 3 | A | A | A | A | A |
| Comparative example 2 | B | B | C | B | B |
| Comparative example 3 | C | C | C | C | C |
| Comparative example 4 | B | C | B | C | C |

As is evident from the above results obtained from examples and comparative examples, when the evaluators wore the lenses obtained in Comparative examples 2 to 4, they felt no change in eye fatigue or felt eye fatigue. In contrast, when the evaluators wore lenses obtained in Examples 1 to 3, they did not feel eye fatigue.

Furthermore, the sample spectacles prepared in examples satisfied the characteristics (1) to (3) of light transmittance. Consequentially, the sample spectacles did not make the evaluators feel eye fatigue and had excellent transparency and external appearance. In addition, by the comparison between Example 3 and Comparative example 2, it was found that even when the amount of the ultraviolet absorber used is the same as the total weight of the polymerizable compound, when the ultraviolet absorber having a maximum absorption peak out of the range of the present invention is used, the light transmittance at a wavelength of 410 nm becomes greatly different from the light transmittance at a wavelength of 420 nm, and the ultraviolet absorber (a) used in the present invention is effective.

The present application claims priorities based on Japanese Patent Application No. 2013-036694 filed on Feb. 27, 2013 and Japanese Patent Application No. 2013-258501 filed on Dec. 13, 2013, and the entire product of which is incorporated herein.

The present invention also includes the following embodiments.

[1] An optical material containing one or more kinds of ultraviolet absorber (a) having a maximum absorption peak within a range of equal to or greater than 350 nm and equal to or less than 370 nm, in which a light transmittance of the optical material having a thickness of 2 mm satisfies the following characteristics (1) to (3)
  (1) a light transmittance at a wavelength of 410 nm is equal to or less than 10%,
  (2) a light transmittance at a wavelength of 420 nm is equal to or less than 70%, and
  (3) a light transmittance at a wavelength of 440 nm is equal to or greater than 80%.

[2] The optical material described in [1], in which the ultraviolet absorber (a) is one or more kinds of compound selected from benzotriazole-based compounds.

[3] The optical material described in [1] or [2], in which the ultraviolet absorber (a) is 2-(2-hydroxy-3-t-butyl-5-methylphenyl)-chlorobenzotriazole.

[4] The optical material described in any one of [1] to [3], that contains at least one kind selected from polyurethane, polythiourethane, polysulfide, polycarbonate, poly(meth)acrylate, and polyolefin.

[5] The optical material described in any one of [1] to [4], including a lens substrate, and a film layer and a coating layer which are optionally laminated over the lens substrate.

[6] A composition for an optical material comprising an ultraviolet absorber including one or more kinds of ultraviolet absorbers (a) having a maximum absorption peak within a range of equal to or greater than 350 nm and equal to or less than 370 nm, and a resin for an optical material (b) or a resin monomer (c), in which the amount of the ultraviolet absorber (a) contained in the composition is 0.3% by weight to 2% by weight with respect to the total weight of the resin for an optical material (b) or the resin monomer (c).

[7] The composition for an optical material described in [6], in which the ultraviolet absorber (a) is one or more kinds of compound selected from benzotriazole-based compounds.

[8] The composition for an optical material described in [6] or [7], in which the resin for an optical material (b) is at least one kind selected from polycarbonate, poly(meth) acrylate, and polyolefin.

[9] The composition for an optical material described in any one of [6] to [8], in which the resin monomer (c) is a combination of a polyisocyanate compound and a polyol compound, a combination of a polyisocyanate compound and a polythiol compound, or a combination of a polyepithio compound and a polythiol compound.

[10] A manufacturing method of a molded product, comprising a step of obtaining the composition for an optical material described in any one of [6] to [9] by mixing the ultraviolet absorber (a) with the resin for an optical material (b) or the resin monomer (c), and a step of curing the composition for an optical material.

[11] A molded product obtained by molding the composition for an optical material described in any one of [6] to [9].

[12] An optical material comprised of the molded product described in [11].

[13] A plastic spectacle lens comprised of the optical material described in any one of [1] to [5] and [12].

[14] A plastic spectacle lens comprising a lens substrate obtained from the composition for an optical material described in any one of [6] to [9].

[15] A film comprised of the molded product described in [11].

[16] A coating material comprised of the molded product described in [11].

[17] A plastic spectacle lens comprising a film layer over at least one surface of a lens substrate, in which the film layer is comprised of a film described in [15].

[18] A plastic spectacle lens comprising a coating layer over at least one surface of a lens substrate, in which the coating layer is comprised of the coating material described in [16].

The invention claimed is:

1. An optical material containing an ultraviolet absorber (a) comprised of
2-(2-hydroxy-3-t-butyl-5-methylphenyl)-chlorobenzotriazole, and
a polysulfide obtained from a polymerizable compound (c) which is a polyepithio compound and/or a polythietane compound, or a combination of a polyepithio compound and a polythiol compound,
wherein the amount of the ultraviolet absorber (a) is 0.3% by weight to 2% by weight with respect to the total weight of the polymerizable compound (c), and
wherein a light transmittance of the optical material having a thickness of 2 mm satisfies the following characteristics (1) to (3),
(1) a light transmittance at a wavelength of 410 nm is equal to or less than 10%,
(2) a light transmittance at a wavelength of 420 nm is equal to or less than 70%, and
(3) a light transmittance at a wavelength of 440 nm is equal to or greater than 80%.

2. The optical material according to claim 1, comprising:
a lens substrate; and
a film layer and/or a coating layer that are laminated over at least one surface of the lens substrate.

3. The optical material according to claim 1, comprising:
a lens substrate; and
a film layer and a coating layer that are laminated over at least one surface of the lens substrate,
wherein the ultraviolet absorber (a) is contained in at least one of the lens substrate, the film layer, and the coating layer.

4. A plastic spectacle lens comprised of the optical material according claim 1.

5. The optical material according to claim 1,
wherein the polymerizable compound (c) is the combination of a polyepithio compound and a polythiol compound.

6. The optical material according to claim 5,
wherein the polymerizable compound (c) is a combination of bis(2,3-epithiopropyl)disulfide, and a mixture which contains 5,7-dimercaptomethyl-1,11-dimercapto-3,6,9-trithiaundecane, 4,7-dimercaptomethyl-1,11-dimercapto-3,6,9-trithiaundecane and 4,8-dimercaptomethyl-1,11-dimercapto-3,6,9-trithiaundecane as main components.

7. A composition for an optical material comprising:
an ultraviolet absorber (a) comprised of 2-(2-hydroxy-3-t-butyl-5-methylphenyl)-chlorobenzotriazole; and
a polymerizable compound (c) which is a polyepithio compound and/or a polythietane compound, or a combination of a polyepithio compound and a polythiol compound,
wherein the amount of the ultraviolet absorber (a) contained in the composition is 0.3% by weight to 2% by weight with respect to the total weight of the polymerizable compound (c), and
wherein the optical material having a thickness of 2 mm prepared from the composition satisfies the following characteristics (1) to (3),
(1) a light transmittance at a wavelength of 410 nm is equal to or less than 10%,
(2) a light transmittance at a wavelength of 420 nm is equal to or less than 70%, and
(3) a light transmittance at a wavelength of 440 nm is equal to or greater than 80%.

8. A manufacturing method of an optical material, comprising:
a step of obtaining the composition for an optical material according to claim 7 by mixing the ultraviolet absorber (a) with the polymerizable compound (c); and
a step of curing the composition for an optical material.

9. A molded product obtained by curing the composition for an optical material according to claim 7.

10. An optical material comprised of the molded product according to claim 9.

11. A plastic spectacle lens comprising a lens substrate comprised of the molded product according to claim 9.

12. A film obtained from the molded product according to claim 9.

13. A coating material comprised of the composition for an optical material claim 7.

14. A plastic spectacle lens comprising a layer comprised of the film according to claim 12 over at least one surface of a lens substrate.

15. A plastic spectacle lens comprising a lens substrate layer over both surfaces of the film according to claim 12.

16. A plastic spectacle lens comprising a coating layer, which is obtained by curing the coating material according to claim 13, over at least one surface of a lens substrate.

17. The composition for an optical material according to claim 7,
   wherein the polymerizable compound (c) is the combination of a polyepithio compound and a polythiol compound.

18. The composition for an optical material according to claim 17,
   wherein the polymerizable compound (c) is a combination of bis(2,3-epithiopropyl)disulfide, and a mixture which contains 5,7-dimercaptomethyl-1,11-dimercapto-3,6,9-trithiaundecane, 4,7-dimercaptomethyl-1,11-dimercapto-3,6,9-trithiaundecane and 4,8-dimercaptomethyl-1,11-dimercapto-3,6,9-trithiaundecane as main components.

* * * * *